(12) United States Patent
Cao et al.

(10) Patent No.: US 7,110,269 B2
(45) Date of Patent: Sep. 19, 2006

(54) SOFT-SWITCHING TECHNIQUES FOR POWER INVERTER LEGS

(75) Inventors: Xiao Hong Cao, Zhejiang (CN);
Shu-Yuen Ron Hui, New Territories (HK)

(73) Assignee: City University of Hong Kong, Kowloon (HK)

( * ) Notice: Subject to any disclaimer, the term of this patent is extended or adjusted under 35 U.S.C. 154(b) by 0 days.

(21) Appl. No.: 11/199,778

(22) Filed: Aug. 9, 2005

(65) Prior Publication Data
US 2006/0033453 A1    Feb. 16, 2006

Related U.S. Application Data

(63) Continuation of application No. 10/437,622, filed on May 14, 2003, now abandoned.

(51) Int. Cl.
*H02M 3/335* (2006.01)
*H05B 37/02* (2006.01)

(52) U.S. Cl. .............................. 363/21.03; 363/21.02; 363/16; 315/209 R; 315/276; 315/225

(58) Field of Classification Search ..................... None
See application file for complete search history.

(56) References Cited

U.S. PATENT DOCUMENTS

| | | | |
|---|---|---|---|
| 4,862,342 A * | 8/1989 | Dhyanchand et al. | ......... 363/40 |
| 4,920,300 A * | 4/1990 | Scott | ....................... 315/209 R |
| 5,192,875 A * | 3/1993 | Kielmeyer, Jr. | ............. 327/118 |
| 5,712,772 A | 1/1998 | Telefus et al. | |
| 5,903,446 A | 5/1999 | Huillet et al. | |
| 6,020,691 A | 2/2000 | Sun et al. | |
| 6,124,680 A | 9/2000 | Shoji et al. | |
| 6,380,694 B1 | 4/2002 | Uchihashi et al. | |
| 2003/0227364 A1 | 12/2003 | Li et al. | |

* cited by examiner

*Primary Examiner*—Tuyet Thi Vo
(74) *Attorney, Agent, or Firm*—Barnes & Thornburg LLP

(57) ABSTRACT

This invention relates to new soft-switching techniques for minimizing switching losses and stress in power electronic circuits using inverter legs. By choosing the switching frequency with specific relationships with the resonant frequency of the power electronic circuits, the proposed switching technique enables the power electronic circuits to achieve soft switching under full load and short-circuit conditions at the defined frequencies for both capacitive and inductive loads. This technique can be applied to an electronic circuit with two switches connected in totem pole configuration between two dc voltage rails or commonly known as a power inverter leg or inverter arm. Examples of these circuits are class-D power converter, half-bridge power converters and full-bridge power converters or inverters. The proposed techniques allow inverter circuits with resistive, capacitive and inductive loads to achieve soft switching.

10 Claims, 20 Drawing Sheets

US 7,110,269 B2

SOFT-SWITCHING TECHNIQUES FOR POWER INVERTER LEGS

CROSS-REFERENCE TO RELATED APPLICATIONS

This patent application is a continuation of U.S. Ser. No. 10/437,622, filed May 14, 2003 now abandonment. The disclosure of U.S. Ser. No. 10/437,622 is hereby incorporated herein by reference.

FIELD OF THE INVENTION

The present invention relates to methods for the soft-switching of power inverter legs, for example, though by no means exclusively, in electronic ballasts for high energy discharge lamps.

BACKGROUND OF THE INVENTION AND PRIOR ART

Many power electronic circuits consist of inverter legs or arms. An inverter leg is shown in FIG. 1. Each inverter leg consists of two power switches (SI and S2) connected across a dc voltage rail. This switch arrangement across a dc voltage rail is also known as a totem-pole configuration. Each switch has an anti-parallel diode (D1 or D2), which can be part of the switch structure in a power mosfet or an externally connected diode. In addition, there is also capacitance across the switch and diode. This o capacitance (C) arises from the inherent capacitance of the switch and diode. In some applications, however, an additional capacitor may be connected across the switch to increase the capacitance if more capacitance is needed for achieving soft switching.

Usually, the node between S1 and S2 is connected to the load circuit (Fig. 1). The two switches are turned on and off in a complimentary manner with a dead time in between. This means that only one switch is turned on at any time. Between the change of switching states, both switches are not turned on for a short period of time that is known as the dead time. Usually, this dead time is a small portion of the switching period. Two inverter legs can be used to form a single-phase full-bridge inverter (FIG. 2). The inverter leg can be used to form a half-bridge inverter as shown in FIG. 3($a$) and FIG. 3($b$). Capacitor Cb is simply a dc voltage blocking capacitor (FIG. 3($b$)). The function of the inverter circuits are to generate an ac voltage from the do votlage supply and apply this ac voltage across the load which may be an energy-consuming component (ie a resistive load) or an energy-storing component such as a capacitor and inductor forming a resonant tank.

Examples of typical loads are shown in FIG. 4 and FIG. 5. In FIG. 4, the overall load consists of a dc voltage blocking capacitor, a resonant inductor, a resonant capacitor and an equivalent resistive load. This is a commonly used circuit for an electronic ballast for a lamp and the resistive load represents the energy consuming lamp. The equivalent resistive load can also be a transformer coupled circuit with the energy-consuming load connected on the secondary transformer circuit via a rectifier (such as the system for a switched mode power supply). FIG. 5 shows multi-resonant circuit with an energy-consuming load. This multi-resonant circuit is an alternative electronic ballast circuit for a high-intensity-discharge (HID) lamp, in which Lr2 and Cr form a relatively low-frequency (e.g. 50 kHz) resonant tank to create a high voltage to ignite the HID lamp and Lrl and Cr form a relatively high-frequency (e.g. 400 kHz) resonant tank for operating the lamp under steady-state conditions. Here Lr2>Lrl.

To understand the problems faced by existing technology, existing soft-switching techniques for power electronic circuits with inverter leg or legs will be described, using the half-bridge circuit in FIG. 4 as an example. The directions of the load current $I_{input}$ and load voltage $V_{input}$ as indicated in FIG. 4 are assigned as positive for the following description.

In the example of FIG. 4, the dc blocking capacitor Cb eliminates the dc component of the ac voltage generated by the inverter leg. The resonant tank consists of Lr and Cr and the dominant resonant frequency is $f_r = \frac{1}{2\pi}\text{sqrt}(L_r C_r)$. If the switching frequency (fs) of the AC rectangular voltage generated by the inverter circuit is higher than fr, the overall load including the resonant tank and resistive load is more inductive than capacitive. In this case (fs>fr), the overall load is considered as inductive and the current Iz is lagging behind the applied ac voltage Vz as shown in FIG. 6($a$). On the other hand, if fs<fr, the overall load is capacitive and the current $I_{input}$ is leading the applied voltage $V_{input}$ as shown in FIG. 6($b$).

FIG. 7 shows three typical switching trajectories of a power switch. The y-axis is the current through the switch and the x-axis is the voltage across the switch. During the transition periods of the turn-on or turn-off processes, a power switch will withstand high transitional voltage (across the switch) and current (through the switch). This is called hard switching. Hard switching not only leads to switching loss and stress, but more importantly causes switching transients or spikes that are major source of electromagnetic interference (EMI). Such EMI problems may induce noise in the gating signals of the power switches, causing reliability problems. For example, if noise is induced in the gate of a nominally-off power switch and triggers the switch to turn on, the inverter leg may have a shoot-through or short-circuit situation. As one solution to this problem it is known to connect a snubber circuit consisting of resistor and capacitor to reduce the high di/dt and dv/dt of the switch so as to reduce the switching loss and stress. However, traditional snubber circuits are lossy because part of the switching loss is transferred from the switch to the snubber resistor. In order to achieve soft switching, it is necessary to create a zero voltage and/or zero current condition for the switch to turn on or off. If either the switch voltage or switch current is zero, the instantaneous product of switch voltage and current is zero. Thus, the switching loss becomes zero. In practice, it may not be possible to achieve absolute zero switch voltage and/or current. Instead, the switch voltage and/or current can be clamped to near-zero value. Such near-zero voltage and/or current zero-voltage and/or current switching may still be considered to be zero voltage or zero current. The general term for zero-voltage or zero-current switching is soft switching.

The following conditions have to be met in order to achieve soft switching in circuits including an inverter leg.

(A) For zero-voltage 'turn off' of power electronic switches S1 and S2

Condition (1)—Parallel capacitance is needed across the power switches S1 and S2 in order to limit the dv/dt of the switch so as to achieve zero-voltage turn off.

Parallel capacitance across the switch can come from the power switches' device capacitance such as the drain-source capacitance of the power mosfet. External capacitor can be added across the switch if necessary. This is a well known technique for zero-voltage turn off of power electronic devices.

(B) For zero-voltage 'turn-on' of power electronic switches S1 and S2

Condition (1*)—The tank current $I_{input}$ should be in the correct direction as follows:

For the inverter circuit example (FIG. 4), soft switching can be achieved if the overall load (including the resonant tank and resistive load) is inductive. The normal understanding in the prior art is that the frequency (fs) of the inverter's ac voltage $V_{input}$ must be higher that the dominant resonant frequency (fr) of the overall load so that the overall load is inductive. The actual soft-switching condition is that the current input is positive just before S2 (bottom switch) is turned on and negative just before S1 (top switch) is turned on (1*) (FIG. 6(a)). This is a necessary condition for zero-voltage switching When S1 is turned off, it is soft-switched off because the parallel capacitor across S1 limits dv/dt of the switch voltage. The initial voltage across S1 is near zero during the turn-off process of S1. Therefore, S1 is zero-voltage (soft) turned off. The next important process is to ensure that S2 is soft-switched on. If fs>fr, the overall load is inductive. The existing method is to add a small dead time between the turn-off of S1 and turn-on of S2. During this dead time, both gating signals for S1 and S2 are off. However, this does not mean that the current $I_{input}$ is not continuous. When S1 is turned off, the capacitor voltage across S1 will rise to the dc rail voltage whilst the capacitor voltage across S2 will discharge to zero. Because the load is inductive, $I_{input}$ must be continuous. So the anti-parallel diode across S2 will be turned on so as to allow $I_{input}$ to flow continuously during this dead time. This means that the voltage across S2 will be clamped by its parallel diode's on-state voltage which is typically 0.7V (this is a near-zero-voltage when compared with the dc rail voltage of tens or hundreds of volts). Therefore, a soft-switching condition is created for S2 to be turned on at zero voltage condition.

Similar arguments apply to the soft-turn-off process of S2 and soft-turn-on process of S1. At the end of the on-time of S2, $I_{input}$ is negative. S2 can be soft turned off because of its parallel capacitor which limits the dv/dt of the voltage across S2. So S2 can be zero voltage (soft) turned off. S1 is not turned on immediately after S2 is turned off because of the dead time. The inductive load current $I_{input}$ has to flow into the anti-parallel diode of S1 during this dead time, thus clamping the voltage across S1 to zero. So S1 can be turned on under zero voltage condition.

The main problem of the above soft-switching method for the inverter circuit is that fs must be greater than fr so that the overall load is inductive. If fs<fr, the overall load becomes capacitive and the soft-switching condition that "the current $I_{input}$ is positive just before S2 is turned on and negative just before S1 is turned on" (1*) cannot be met (FIG. 6(b)). If $I_{input}$ is negative just before S2 is turned on, the anti-parallel diode of S2 is not conducting. Thus, the voltage across S2 is not clamped to zero for S2 to turn on and soft-switching condition is lost.

Condition (2*): Tank current $I_{input}$ must exceed a minimum magnitude in order to fully discharge total equivalent capacitance across the power switch for zero-voltage switching—Equation (3).

It is necessary to find the current threshold for soft switching in the operating frequency region. When the current is above the current threshold, soft switching can be achieved. The current $i_{input}$ should be large enough to remove the charge on (discharge) the total equivalent capacitance across the power switch (such as the drain and source of the power mosfet). The requirement can be expressed by below equation:

$$Qs = \int_{-t_d/2}^{t_d/2} i_{input}(t) dt \geq 2C_s V_g \quad (1)$$

where Qs is the charge and Cs is the total equivalent capacitance across the power switch (e.g. drain and source of the power switch), Vg is the dc inverter voltage and $t_d$ is the dead time between the gating signals of S1 and S2.

If a resonant tank is used in the load circuit, the input circuit can be approximated as a sinusoidal current because of the filtering effect of the resonant tank.

$$i_{input}(t) = I_{input} \sin(\omega_s t - \phi) \quad (2)$$

where $I_{input}$ is the peak magnitude of $i_{input}(t)$, $\omega_s = 2\pi f_s$ is the angular frequency of the inverter, t is the time variable and $\phi$ is the phase angle between the voltage generated by the inverter leg ($V_{input}$) across the load circuit.

Based on (1) and (2), the input current must obey the following equation in order to create a zero-voltage condition for the power switch to achieve soft switching:

$$I_{input} \geq C_s V_g \omega_s / \sin(\omega_s \cdot t_d/2) \quad (3)$$

Therefore, equation (3) must be met as a necessary condition for soft switching. This equation provides a guideline to choose the appropriate $t_d$, Cs and fs.

SUMMARY OF THE INVENTION

The present invention provides new soft-switching techniques for inverter bridges. According to the present invention there is provided a method of operating a power electronics circuit comprising an inverter and a load including a resonant tank, wherein said inverter is switched at a frequency $f_s$ and said resonant tank has a resonant frequency $f_r$, wherein $K < f_r/f_s < K+1$ where K is an even-numbered integer.

In particular, a first preferred method enables soft switching to be achieved in the inverter bridge with overall capacitive load or for inverter operating at a frequency below the dominant resonant frequency of the resonant tank(s). This may be considered a "pseudo inductive soft-switching" method. Within the nominal "capacitive" operating range (fs<fr), certain frequency regions may be defined that can be considered to be pseudo-inductive regions. Within the pseudo inductive regions, soft switching can be achieved even though the frequency range is within the capacitive region. A second preferred method includes the use of an additional and unloaded resonant tank that provides a current path to ensure soft-switching irrespective of the load condition. This additional resonant tank lowers the minimum inverter frequency at which soft switching can be achieved. Even if the inverter operates in the nominally capacitive region of the original resonant tank, the inductive effect of the additional resonant tank makes soft switching possible at a lower inverter frequency.

According to conventional resonant circuit theory, a series resonant tank works in the "capacitive" region when the inverter operating frequency $f_s$ is below its resonant frequency $f_r$, namely $1/2\pi \sqrt{L_r C_r}$ of the resonant tank. However, in embodiments of this invention that, in the nominal capacitive region (fs<fr), when the frequency ratio N (=$f_r/f_s$)

is larger than an even number and smaller than the nearest odd number, soft switching can still be achieved as if the operation is in inductive region as described in the background section. Because the soft switching conditions required can be met even thought fs<fr, we call these soft-switching regions within the capacitive region 'pseudo inductive' regions. The corresponding soft-switching technique proposed in this invention is called 'pseudo inductive' soft-switching technique.

The invention also provides a method of ensuring that there is a threshold current for enabling soft-switching in the event, for example, of the load acting as a short-circuit using an auxiliary resonant load. In particular the invention also extend to a method of operating a power electronics circuit comprising an inverter and a load including a resonant tank, wherein an auxiliary resonant tank is provided between said inverter and said load whereby in the event of the load acting as a short-circuit during operation, current provided by said auxiliary resonant tank enables soft-switching of said inverter.

BRIEF DESCRIPTION OF THE DRAWINGS

Some embodiments of the invention will now be described by way of example and with reference to the accompanying figures in which.

DETAILED DESCRIPTION OF PREFERRED EMBODIMENTS

In preferred embodiments of this invention a novel pseudo-inductive soft-switching technique is provided that can be applied to the circuits described in FIGS. 1–5. The overall load Z can consist of different combination of resonant tank(s) and is not restricted to the forms shown in FIG. 4 and FIG. 5.

A first embodiment of the present invention (which may be termed a "pseudo-inductive soft-switching" method) will now be described firstly by reference to theory, and then by experimental verification of the theory.

Figure 1:
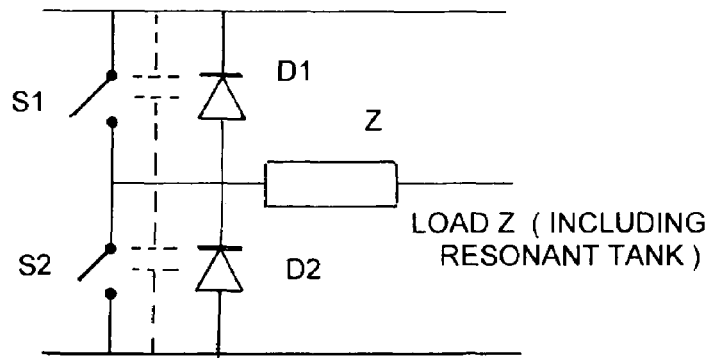
FIG. 1 illustrates a typical inverter leg.
Figure 2:
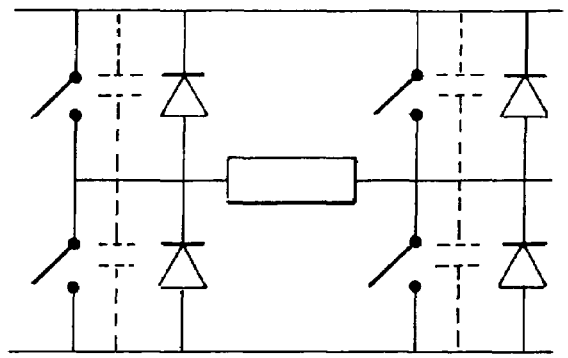
FIG. 2 illustrates a single-phase full-bridge inverter.
Figure 3A:
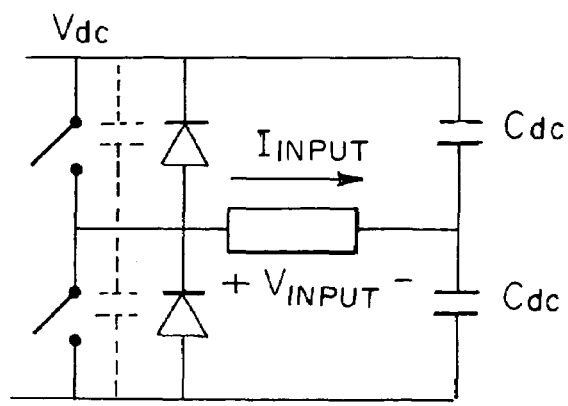
FIGS. 3(a) and (b) show alternative forms of single-phase half-bridge inverters.
Figure 3B:
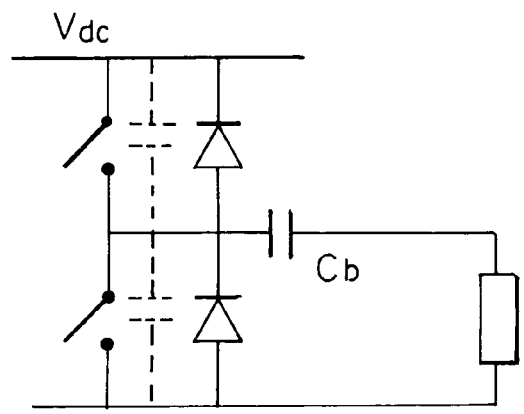
Figure 4:
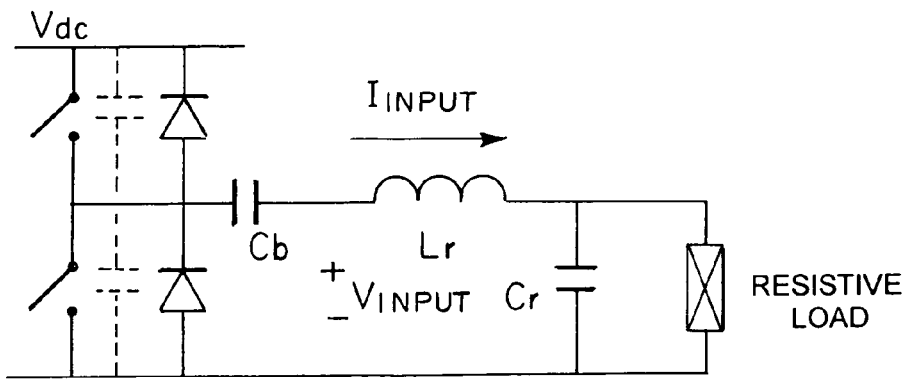
FIGS. 4 and 5 illustrate half-bridge inverters different loads, FIGS. 6(a) and (b) show respectively typical voltage and current waveforms for an inverter bridge in (a) the inductive region and (b) the capacitive region.
Figure 5:
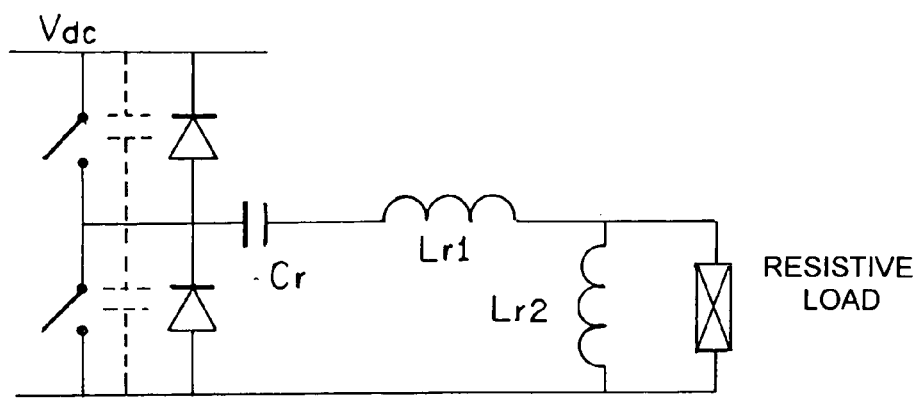
Figure 6:
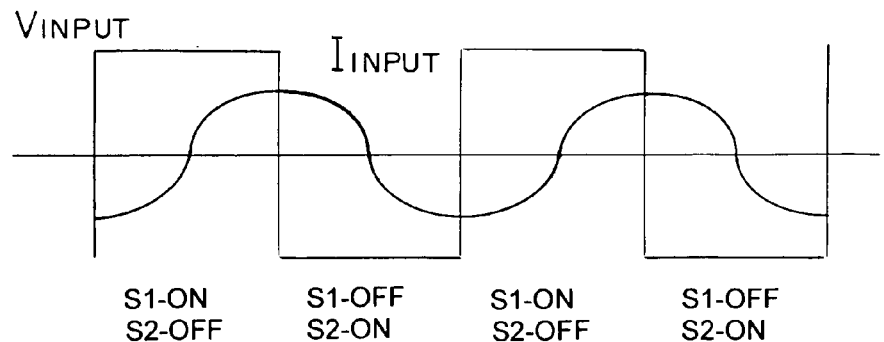
Figure 6:
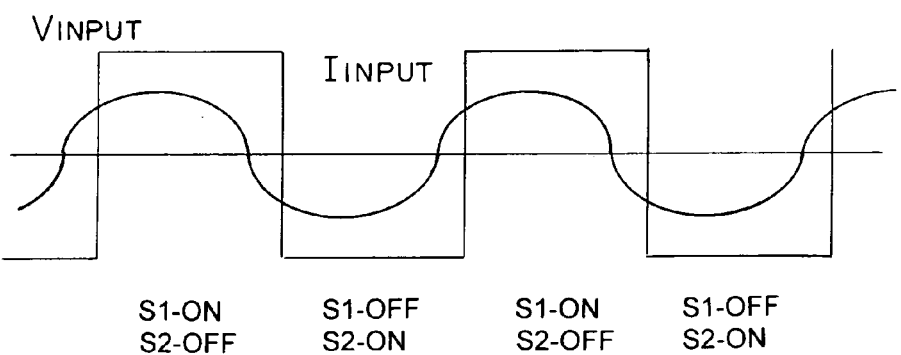
Figure 7:
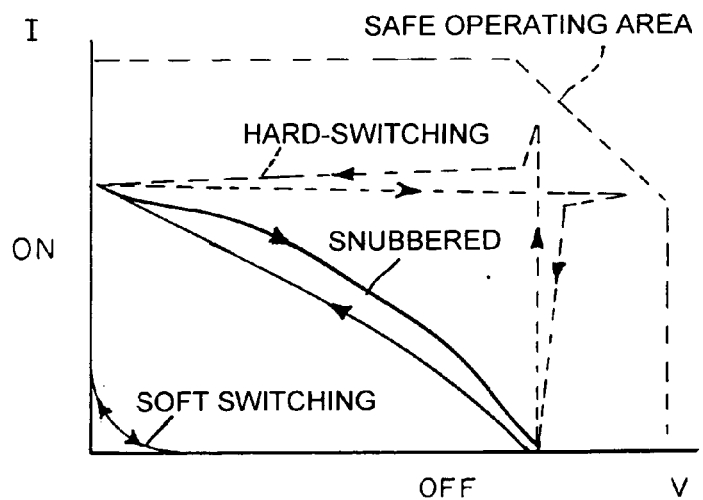
FIG. 7 illustrates typical switching trajectories of a power switch.
Figure 8:
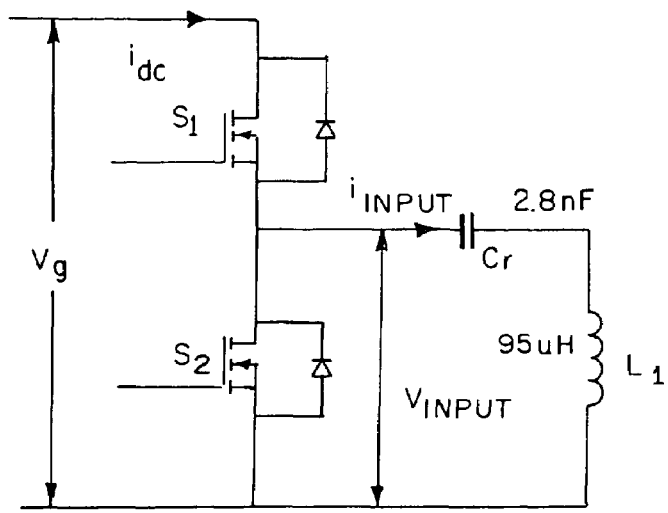
FIG. 8 shows a half-bridge inverter loaded by a series resonant tank, FIGS. 9(a) and (b) show (a) classification of the inductive and capacitive regions according to frequency ratio and (b) required current direction as a function of frequency ratio to achieve soft-switching.

The half bridge inverter loaded by series resonant tank shown in FIG. 8 is considered as an example to illustrate the soft-switching technique in the capacitive region based on the pseudo-inductive region concept. Based on the Fourier analysis approach, the input voltage $V_{input}$ and input current $I_{input}$ to the resonant tank can be expressed by following equations:

The rectangular ac voltage applied to the resonant tank is:

$$V_{input} = V_g/2 + 2V_g \Big/ \pi \bigg( \sum_{n=2k-1}^{\infty} (1/n) \sin(n\pi t/T_s/2) \bigg), \quad (4)$$

$$k = 1, 2, 3, \Lambda, \infty$$

Normally a DC-blocking capacitor is used to remove the Dc component $V_g/2$. The AC current entering the resonant tank is:

$$i_{input} = 2V_g \Big/ \pi ( \sum_{n=2k-1}^{\infty} (1/(n(jn\omega_s L_r + 1/(jn\omega_s C_r))) \sin(n\pi t/T_s/2)) \quad (5)$$

-continued $$= 2V_g \Big/ \pi(\sum_{n=2k-1}^{\infty} (1/(n^2\omega_s L_r - 1/(\omega_s C_r))\cos(n\pi t/T_s/2))$$

$V_{input}$ and $I_{input}$ have only odd harmonic components, where $V_g$ is the DC link voltage and $T_s$ is the switching cycle; $\omega_s = 2\pi f_s = 2\pi/T_s$. The resonant frequency is $fr = \frac{1}{2}\pi \text{sqrt}(L_r C_r)$ and the characteristic impedance $Z_r = \text{sqrt}(L_r/C_r)$.

Define a variable to represent the ratio between $f_s$ and $f_r$:

$$N = f_s/f_r \quad (6)$$

When 0<N<1, the resonant tank works at the inductive region as explained in the background section and the input current to the resonant tank lags the input voltage pulse. In other words, $i_{input}$ is positive when S1 is turned off and just before S2 is turned on and negative when S2 is turned off and just before S1 is turned on. This is the essential condition for soft switching.

Figure 9:
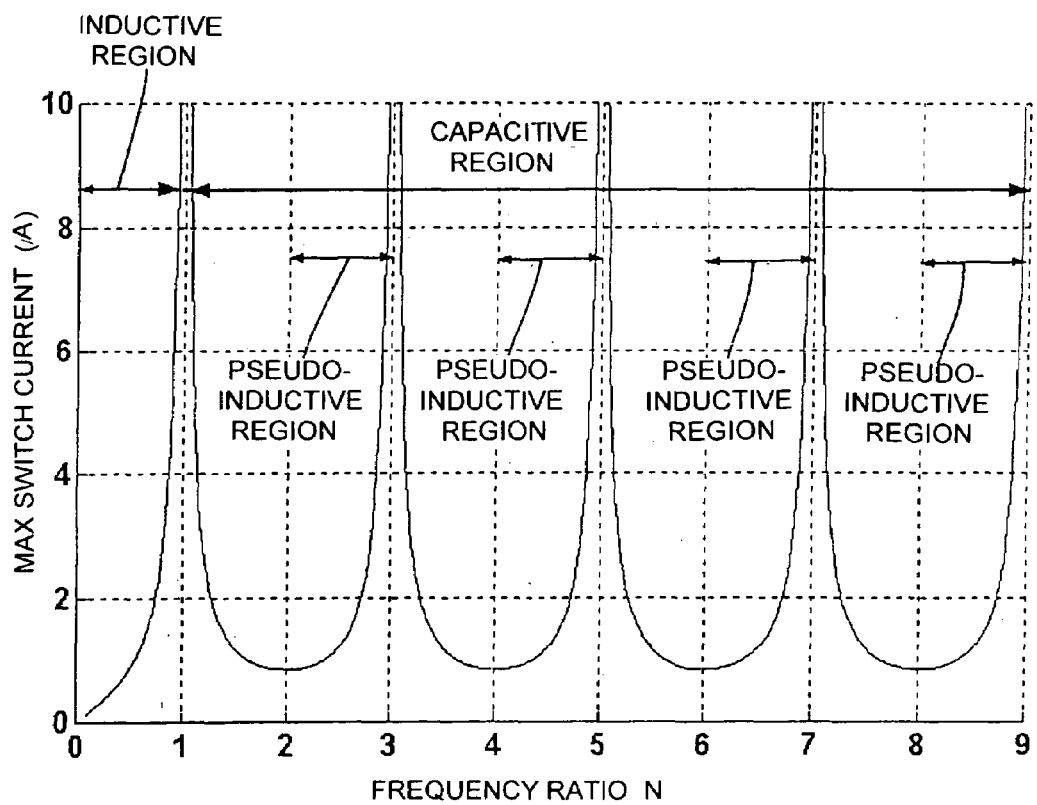
Figure 9:
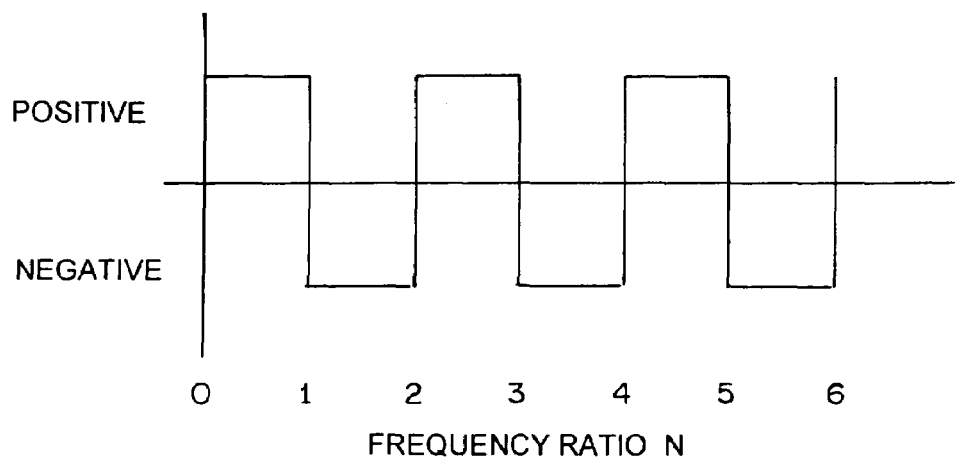

Referring now to FIG. 9(a) the nominal capacitive region when N>1 can be considered. Substitute N in the equation of $i_{input}$, $$i_{input} = 2V_g \Big/ \pi(\sum_{n=2k-1}^{\infty} (1/(nZ_r(n/N - N/n))\cos((n/N)(\omega_r t))) \quad (7)$$

Note the n is an odd number in the equation.

From this equation, it can be found that when N equals to one of the odd numbers, such as 1,3,5, . . . , the factor (n/N–N/n) will be equal to zero when n equals to N, and thus the n-th harmonic component will make $i_{input}$ infinite, and the frequency $f_r/N$ (N=1,3,5, . . . ) acts as a resonant frequency, which is called a sub-resonant-frequency. When the switching frequency of the inverter $f_s$ comes near such sub-resonant-frequencies, the local dominant resonant frequency will be predominated by the sub-resonant-frequency accordingly. In summary, the whole capacitive region can be subdivided into many small regions by the sub-resonant-frequencies as shown in FIG. 9(a).

When the inverter switching frequency $f_s$ is higher than the dominant resonant frequency $f_r$ of the resonant tank, i.e. 0<N<1, this operating region is said to be inductive because the soft-switching condition (1*) that: the current $I_{input}$ is positive when S1 (top switch) is turned off and just before S2 (bottom switch) is turned on, and the current $I_{input}$ is negative when S2 is turned off and just before S1 is turned on is complied with.

The region of N>1 (i.e. $f_s<f_r$) is usually considered as capacitive and previously considered as unsuitable for soft switching. However, under certain conditions soft switching can actually be achieved in this nominal capacitive region. In particular, the capacitive region can be divided into two types, namely capacitive regions and pseudo-inductive regions.

The capacitive regions (in which soft switching cannot be achieved) meet the following two conditions:

$$f_s < f_r \quad (I)$$

$$f_r/(K+1) < f_s < f_r/K \quad (II)$$

or $K < f_r/f_S < K+1$ or $K < N < K+1$, where $K=1,3,5, \ldots$ (8)

Under these conditions, $i_{input}$ is negative when S1 is turned off and before S2 is turned on, and $i_{input}$ is positive when S2 is turned off and just before S1 is turned on. The anti-parallel diode of the incoming (to be turned on) power switch is not conducting and will not clamp the voltage of the incoming switch to zero, resulting in hard switching.

However, soft switching can be achieved within the pseudo inductive regions in the nominal capacitive region. By choosing an appropriate value of N (ratio of $f_r$ and $f_s$), soft switching can be achieved in the capacitive region. In the capacitive region of N>1, when $$f_r/K < f_s < f_r/(K-1)$$

or $K < f_r/f_s < K+1$ or $K < N < K+1$, where $K=2,4,6, \ldots$ (9)

$i_{input}$ is positive when S1 is turned off and negative when S2 is turned off. This is the condition required by soft switching and is similar to that in the inductive region. These equivalent inductive regions may be called pseudo-inductive regions.

In summary, for N>1 (i.e. $f_s<f_r$), the nominal capacitive region is further divided into two types:

(1) The capacitive regions:

Odd integers<N<Even integers ⇒capacitive characteristics, such as:

1<N<2,3<N<4,5<N<6, . . .

(2) The pseudo-inductive regions:

Even integers<N<Odd integers ⇒pseudo-inductive characteristics, such as:

2<N<3,4<N<5,6<N<7, . . .

Soft switching achieved in the pseudo-inductive regions can be explained in an intuitive way. Consider N=fr/fs again. If N>1, there are more than one resonant period within the inverter switching period. If N is chosen to satisfy equation (9), the resonant current is in the positive half cycle when the top switch S1 is turned off, and it is in the negative half cycle when the bottom switch is turned off. Therefore, if equation (9) is satisfied, the soft switching conditions (1*) can be met. The required direction of $i_{input}$ for the inverter to achieve soft-switching condition is shown in FIG. 9(b).

Experimental Verification:

The pseudo-inductive soft-switching technique is illustrated with a half-bridge power inverter circuit example (FIG. 10) that is suitable for electronic ballast of high-intensity-discharge (HID) lamp. There are two resonant frequencies in this system. Inductance Ls is much larger than inductance Lr. The operating procedure is as follows:

(1) By operating the inverter frequency fs=fs$_L$ close to a low resonant frequency fr=fr$_L$ (about 56 kHz in this example), which is due to the resonant tank that consists of Cr and Ls+Lr (Ls>>Lr), a high voltage can be generated across the resonant inductor Ls to ignite the discharge lamp. Before ignition, the lamp behaves like an open circuit.

(2) In the lamp's glow-to-arc transitional period, the lamp is close to a short-circuit situation (shorting the large inductor Ls).

(3) Once the lamp arc is established, the lamp is like a resistor. The steady-state inverter frequency is then increased to a high value (fs=fs$_H$) higher than the high resonant frequency fr=fr$_H$ (about 307 kHz in this example), which is due to the resonant tank consisting of Cr and Lr.

This circuit is good example to illustrate the usefulness of the invention. Before the lamp is ignited in stage (1) at a lower starting frequency $fs_L$, the lamp is like an open circuit. The dominant resonant frequency of the resonant tank is $fr_l$. The starting inverter frequency $fs_L$ should be slightly higher than $fr_L$, in order that the resonant voltage across Ls is large enough for lamp ignition and the resonant tank operated in the inductive region for achieving soft switching. However, when the lamp starts to ignite and gets into the glow-to-arc transition, it behaves like a short circuit (shorting the large inductor Ls). In this case, the effect of Ls suddenly disappears and the resonant tank consists of Cr and Lr only. This means that the dominant resonant frequency is suddenly changed from $fr_L$ to $fr_H$ during the glow-to-arc transition. Since the initial inverter frequency is slightly higher than $fr_L$, the initial inverter switching frequency is in the 'capacitive' region of the high-frequency resonant tank circuit of Cr and Lr. If the starting inverter switching frequency $fs_L$ is not chosen to be in the pseudo-inductive region of the in the high-frequency resonant tank according to equation (9), then hard-switching will occur and the inverter could be damaged by the high switching loss and stress in the power switches. The HID lamp load is a good example of a changing load even under steady-state high-frequency $fr_H$ operation. The lamp arc behaves like a resistive load under normal state operation and could change into an open circuit if the lamp arc is broken due to acoustic vibration. Therefore, soft switching has to be achieved under different conditions:

In summary, the HID lamp ballast example has the following operating modes:

a) The lamp behaves like an open circuit before ignition, when a relatively low inverter starting frequency $fs_L$ is used and a dominant resonant frequency is $fr_L$.

b) The lamp behaves like a short circuit in the glow-to-arc transition during the ignition process, with the inverter operating at $fs_L$ and a dominant resonant frequency suddenly changed to $fr_H$ and the inverter frequency remains at $fs_L$.

c) Immediately after the ignition process is completed, the lamp behaves like a resistive load at an inverter frequency of $fs_L$.

d) The inverter frequency is then increased to a relatively high value $fs_H$ for steady-state lamp operation. The lamp behaves like a resistive load.

e) The lamp behaves like an open circuit when the lamp arc is broken due to acoustic resonance, when the inverter frequency is a relatively high $fs_H$.

Among these operating modes, modes (b) and (e) have the potential danger of hard switching. In mode (b), the sudden change of dominant resonant frequency to $fr_H$ while the inverter switching frequency remains at $fs_L$. Consequently, the inverter circuit could be operated in the nominally capacitive region with hard switching and Condition (1*) cannot be met. In mode (e), if the load becomes an open circuit, the input current can become smaller than the minimum level as required in equation (3) because the inverter frequency is now high (fs=$fs_H$). Thus, Condition (2*) may not be met.

In this experimental system, the DC link is set at 310V. HIE-E27 150W metal halide is selected for testing. The starting inverter frequency $fs_L$ should be higher than the low resonant frequency $fr_L$ (56 kHz) and the steady-state inverter switching frequency $fs_H$ should be higher than the high resonant frequency $fr_H$ (307 kHz). In this system, it is thus safe to choose a steady-state inverter frequency $fs_H$ (after the lamp is fully turned on) to be 400 kHz because the resonant tank would be in the inductive region for achieving soft switching. The key question is how to choose the starting inverter frequency $fs_L$ appropriately so that it is in the pseudo-inductive region of the high-frequency resonant tank of Cr and Lr during the starting period.

Test 1: Confirmation of the inductive region ($fs_H > fr_H$)

Figure 10:
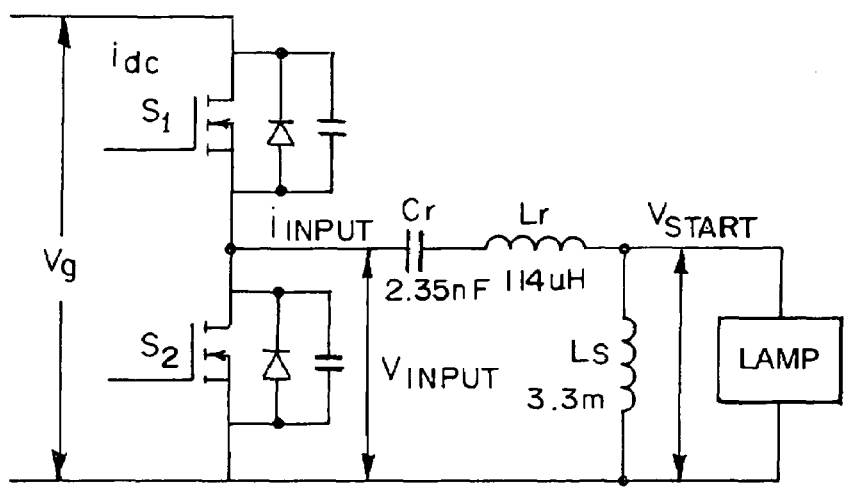
FIG. 10 illustrates a half-bridge inverter used in experimental verification of embodiments of the present invention, FIGS. 11(a), (b) and (c) show (a) simulated and (b) measured tank voltage and current respectively, and (c) measured gate signals in a first test, FIGS. 12(a), (b) and (c) show (a) simulated and (b) measured tank voltage and current respectively, and (c) measured gate signals in a second test, FIGS. 13(a), (b) and (c) show (a) simulated and (b) measured tank voltage and current respectively, and (c) measured gate signals in a third test, FIGS. 14(a), (b) and (c) show (a) simulated and (b) measured tank voltage and current respectively, and (c) measured gate signals in a fourth test.

The large inductor Ls in FIG. 10 is shorted so that the equivalent resonant tank consists of Lr and Cr only. This high resonant frequency $f_r = fr_H$ is about 307 kHz. The steady-state inverter switching frequency $fs_H$ is set at 400 kHz so that the frequency ratio N<1 (N=$fr_H/fs_H$=0.77) and the resonant tank operation should be in the inductive region.

Figure 11A:
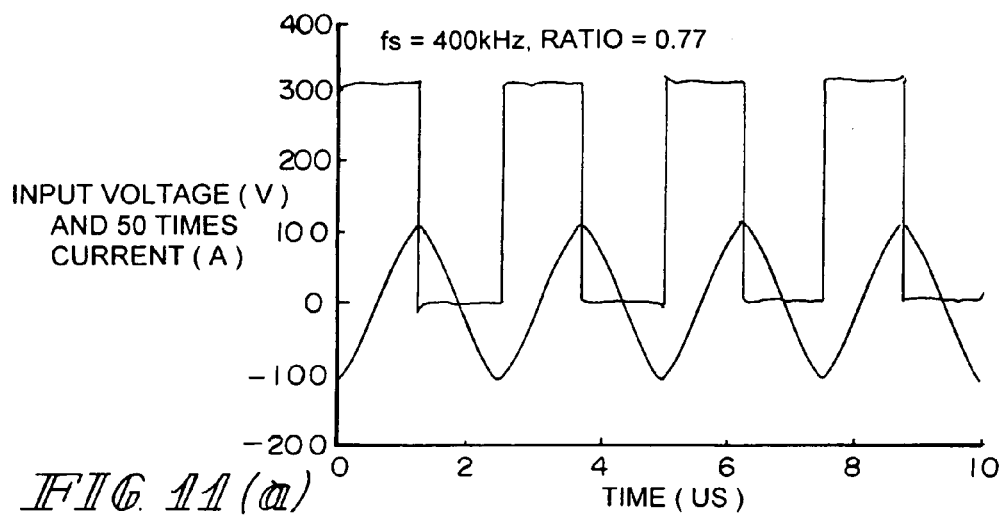
Figure 11B:
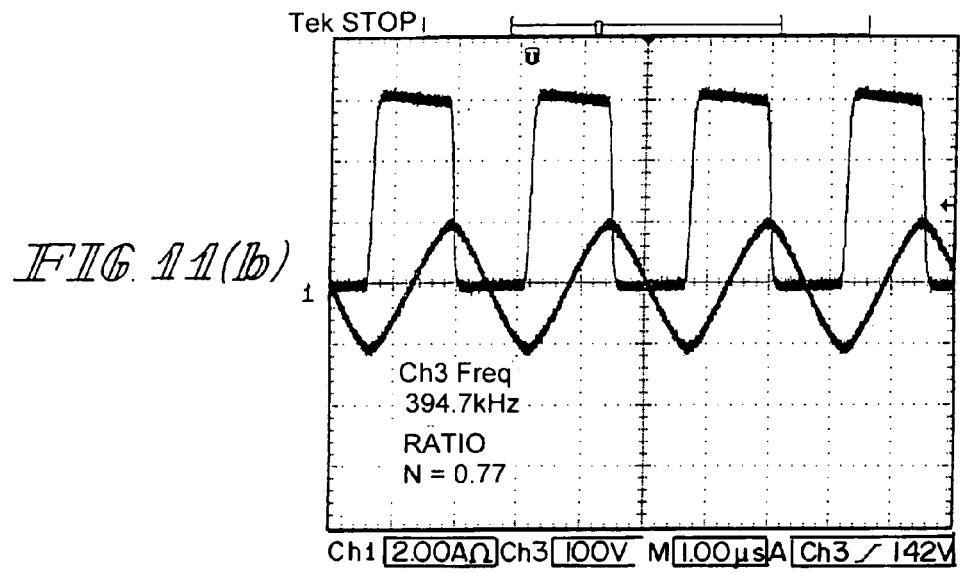
Figure 11C:
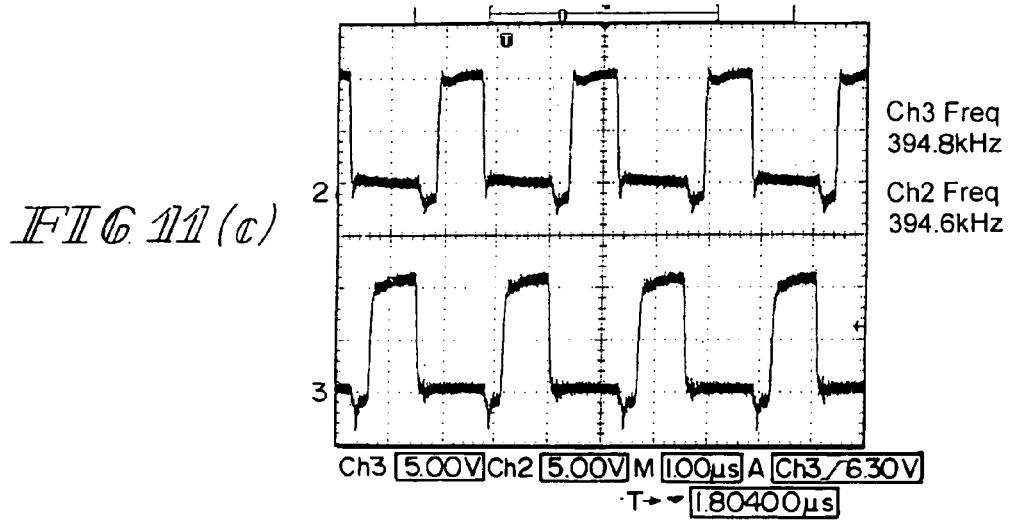

FIG. 11 (a) and FIG. 11(b) show the simulated and measured tank voltage $V_{input}$ and current $I_{input}$, respectively, when the steady-state inverter switching frequency $f_s = fs_H$ is set at 400 kHz (i.e. $fs_H > fr_H$). The simulations and measurements confirm that the tank current $I_{input}$ is lagging behind the tank voltage $V_{input}$. This inductive feature meets the soft switching requirement (1*). FIG. 11(c) shows the measured gating signals of the power mosfets S1 and S2. It can be seen that these gate signals are relatively 'clean' without any induced voltage spikes that commonly arise from hard switching.

Test 2: Confirmation of capacitive region with the steady-state inverter frequency $fs_H < fr_H$ and N failing to satisfy the pseudo-inductive requirement in equation (9)

Similarly to Test 1, the large inductor Ls in FIG. 10 is shorted so that the equivalent resonant tank consists of Lr and Cr only. When the steady-state inverter frequency $f_s = fs_H$ is changed to 200 kHz, N>1 (N=$f_r/f_s$=1.54). As $fs_H < fr_H$, this operating region is capacitive. Note that N is higher than an odd integer and less than an even integer in this case. This means that N fails to meet the pseudoinductive requirement in equation (9).

Figure 12A:
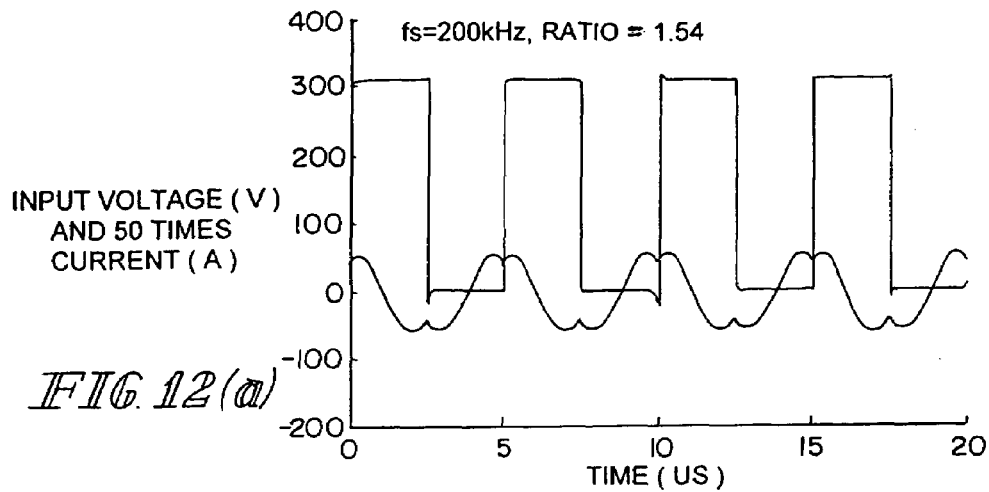
Figure 12B:
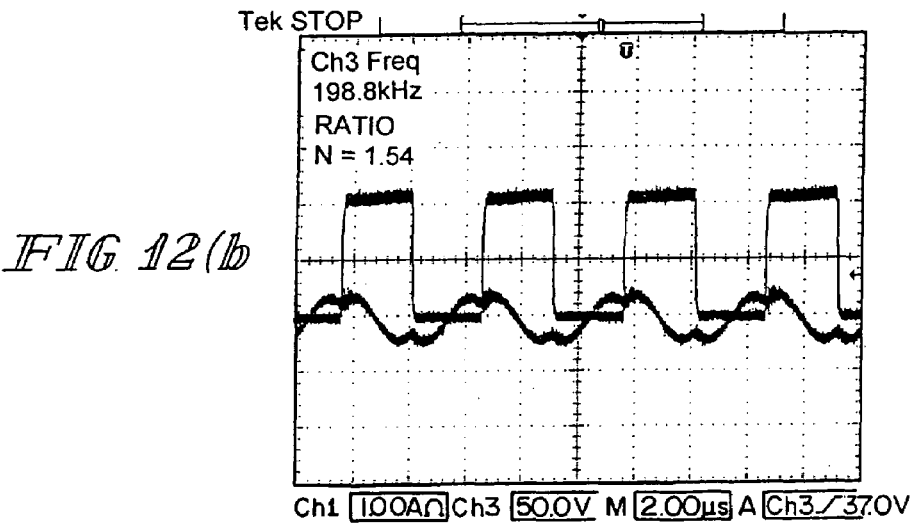
Figure 12C:
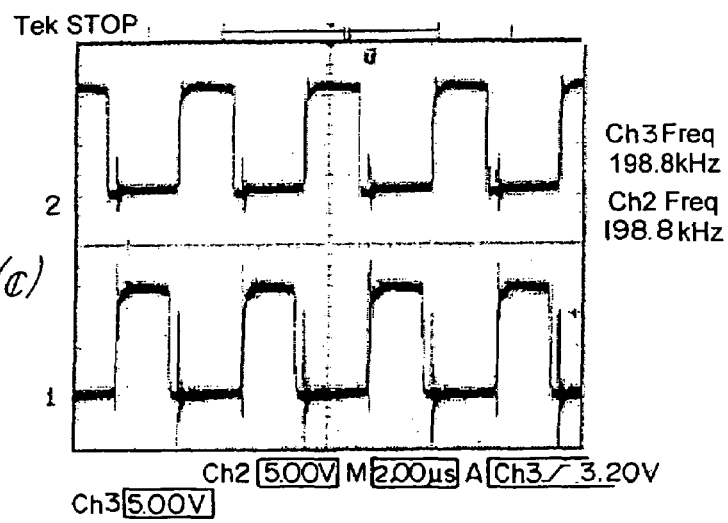

FIG. 12(a) and (b) show the calculated and measured $V_{input}$ and $I_{input}$, respectively, under this operation. It can be seen that $I_{input}$ is leading $V_{input}$, confirming the capacitive characteristic of the circuit. Soft switching condition 1* is not met in this case. The switching noise arising from hard switching can be observed from the high induced voltage spikes in the measured gate signals of S1 and S2 as shown in FIG. 12(c). This switching noise could be a serious reliability problem because it can inadvertently turn on a power switch and result in a short-circuit situation in the inverter bridge.

Test 3: Confirmation of capacitive region with starting inverter frequency $fs_L < fr_H$ and N failing to satisfy the pseudo-inductive requirement in equation (9)

When the HID lamp is in the glow-to-arc transition the starting inverter switching frequency $fs_L$ is slightly higher than 56 kHz. But the lamp behaves like a short circuit, shorting Ls. The effective resonant frequency will suddenly change from $f_r = fr_L$ (due to Cr and Ls+Lr) to $f_r = fr_H$ (due to Cr and Lr). In this test, the starting frequency is chosen so that the frequency ratio N does not meet the pseudo-inductive requirement in equation (9). In this case, $f_r = fr_H = 307$ kHz. The starting frequency is set at $fs_L = 86$ kHz so that N=3.56 which is higher than an odd integer instead of an even integer.

Figure 13A:
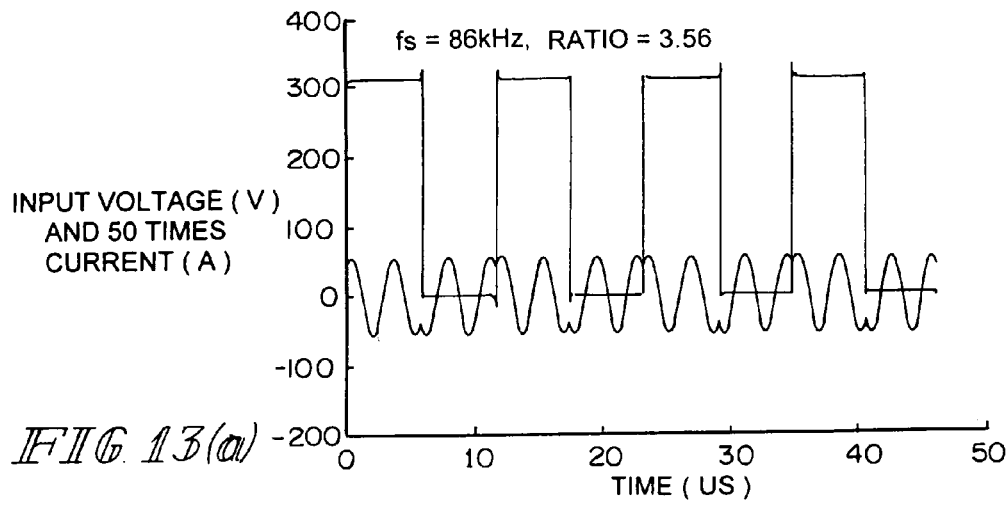
Figure 13B:
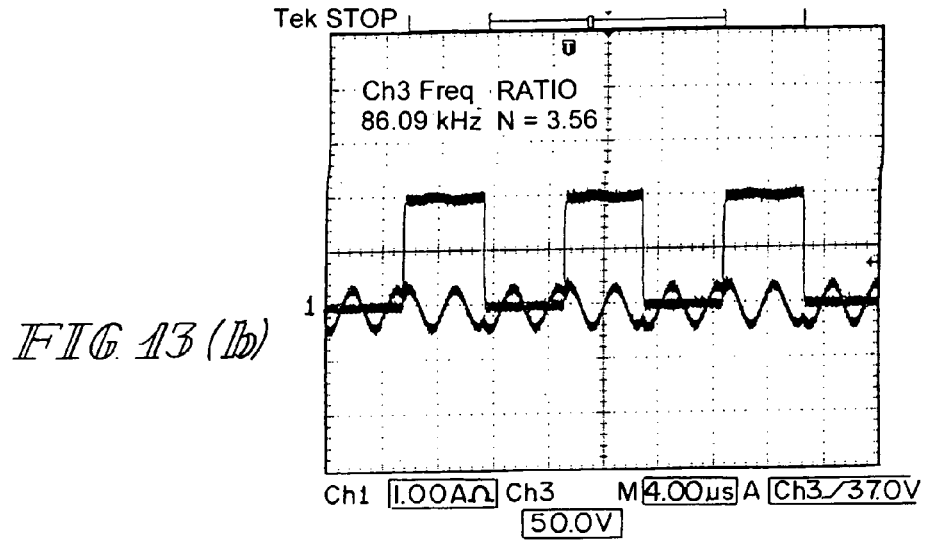
Figure 13C:
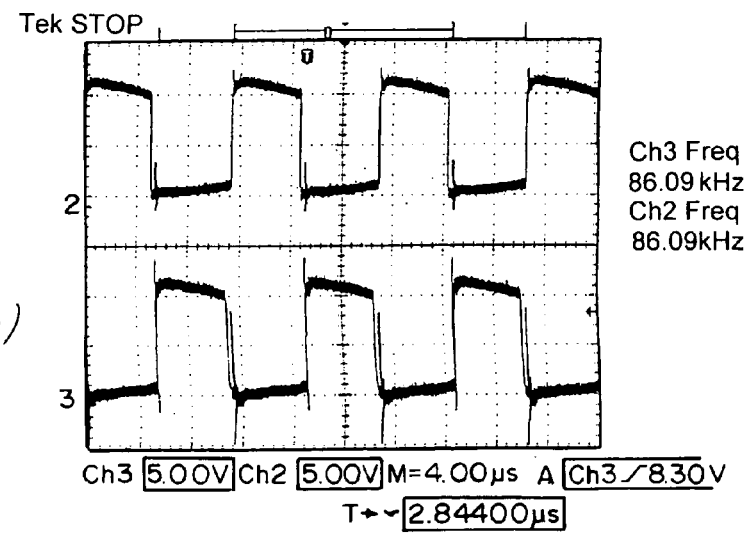

FIG. 13(a) and FIG. 13(b) show the calculated and measured $V_{input}$ and $I_{input}$, respectively. As predicted, the soft-switching condition 1* is not met. FIG. 13(c) shows the gating signals of the two switches S1 and S2. The induced voltage spikes arising from hard switching can clearly be observed.

Test 4: Confirmation of pseudo-inductive soft-switching technique in the nominally capacitive region ($fs_L < fr_H$) with N greater than an even integer and smaller than the last odd integer.

Figure 14A:
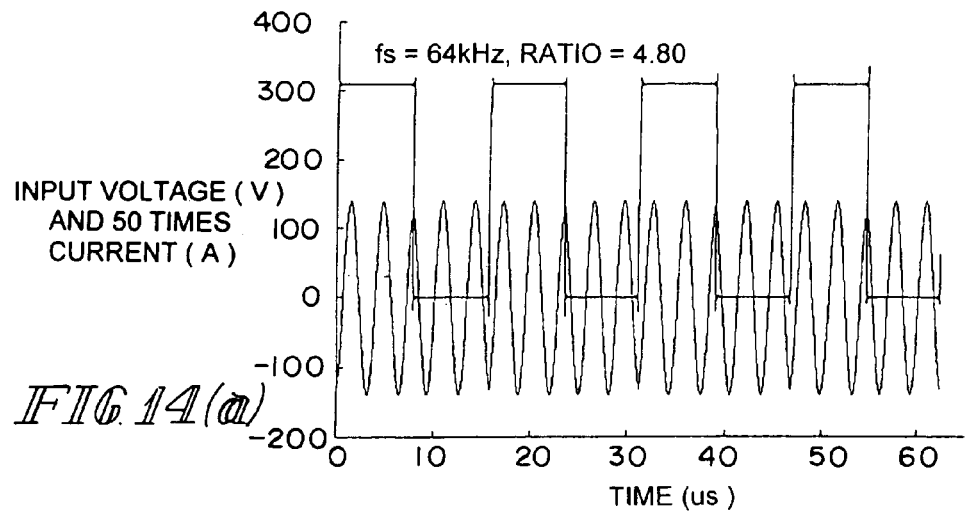
Figure 14B:
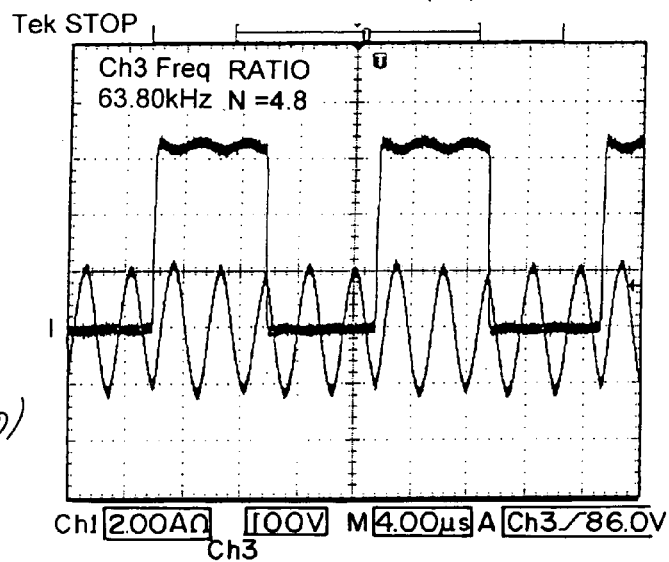
Figure 14C:
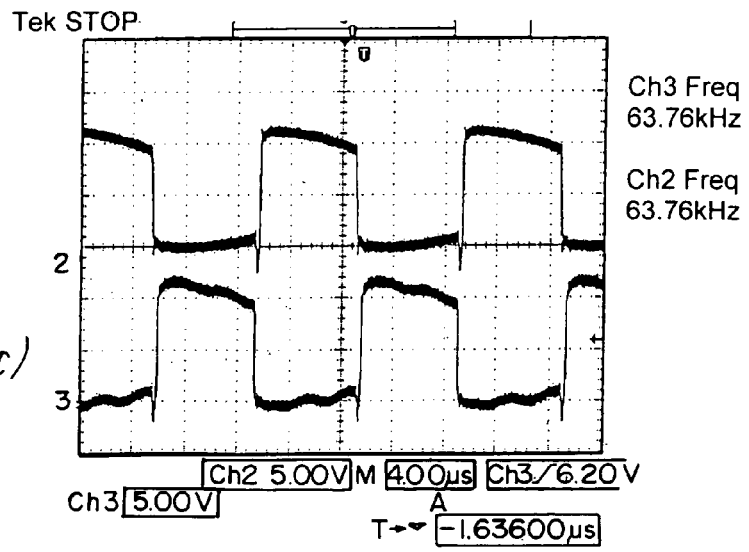

Test 3 shows that if the starting inverter frequency $fs_L$ does not meet the pseudo-inductive requirement in equation (9), hard switching will occur and the induced switching noise (FIG. 13(c)) could be quite significant. As assumed in tests 1 to 3, the lamp is in the short-circuit condition so that the effective resonant frequency is $f_r=fr_H$ (due to Cr and Lr only). The starting inverter frequency $fs=fs_L$ is now set at 64 kHz, which is higher than $fr_L=56$ kHz. The effective frequency ratio $N=fr/fs=fr_H/fs_L=4.8$, which is higher than an even integer. This means that this is in the pseudo-inductive region, FIG. 14(a) and FIG. 14(b) show the calculated and measured $V_{input}$ and $I_{input}$, respectively. Despite the fact the $f_s<f_r$ (equivalent capacitive load), Input is positive when S1 is turned off. The soft switching condition described in condition 1 * is met. FIG. 14(c) shows the gating signals for the S1 and S2. It can be seen that no switching noise is induced in them.

A second embodiment of the present invention uses an additional or auxiliary resonant tank. This embodiment will now be described again with regard to theory first of all, and then with experimental justification. There are two different versions of this embodiment: one in which the additional resonant tank has a relatively high resonant frequency, and another in which the additional resonant tank has a relatively low resonant frequency. When the additional resonant tank has a relatively high resonant frequency there are more than one resonant cycles in the resonant tank within one cycle of the inverter switching frequency and this may be called the resonant mode of operation. On the other hand, when the additional resonant tank is operated at a relatively low resonant frequency, the resonant tank is charged and discharged once within each inverter cycle. This may be termed a linear mode.

Figure 15:
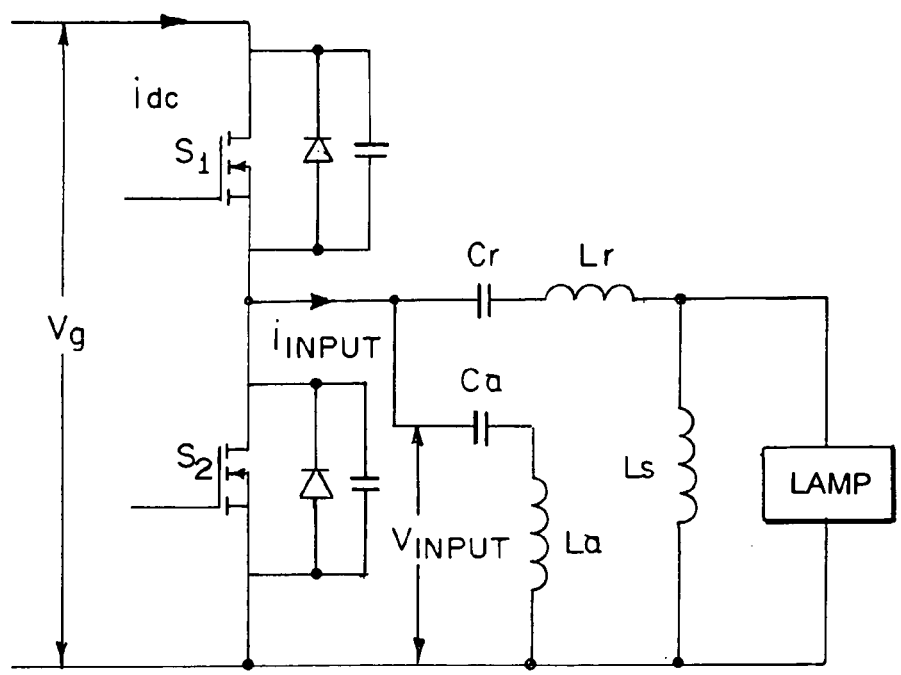
FIG. 15 shows a half-bridge inverter circuit for use in a method according to a second embodiment of the invention.
Figure 16:
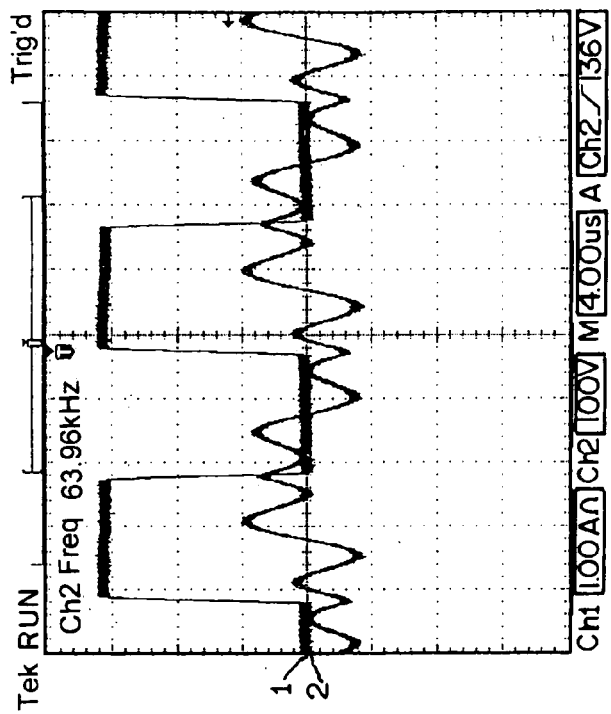
FIG. 16 shows simulated (left) and measured (right) voltage and current waveforms in a test of the second embodiment of the invention.
Figure 16:
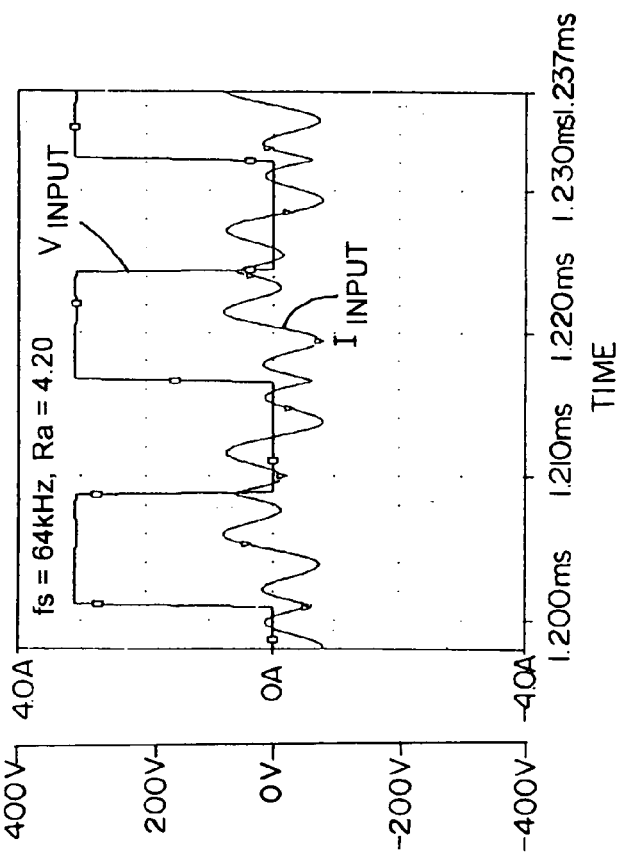
Figure 20:
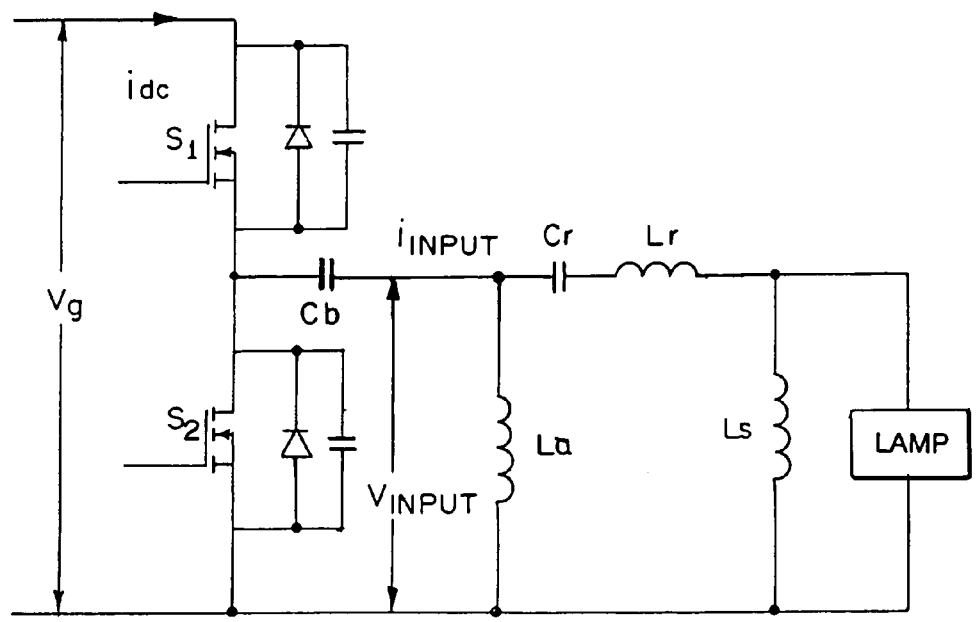
FIG. 20 shows a half-bridge inverter circuit similar to FIG. 15 but in an alternate embodiment.

The basic concept of the use of an additional resonant tank is illustrated with the use of FIG. 15 and FIG. 20. FIG. 15 shows a resonant circuit similar to the circuit example in FIG. 10, except that an additional unloaded resonant tank capacitor Ca and inductor La is added. An alternative implementation is to use the dc blocking capacitor Cb and La to form an additional unloaded resonant tank as shown in FIG. 16

(A) Additional or auxiliary parallel resonant tank (Resonant Mode) (FIG. 15)

Through proper selection of the components' parameters of the auxiliary capacitor and auxiliary inductor, the auxiliary resonant tank can operate at an 'inductive' state in the high frequency range (namely the operating frequency $fs_H$ of the load such as an HID lamp), and at a 'pseudo-inductive' state in the low frequency range (namely the starting inverter frequency $fs_L$). Thus lagging current can be generated independently, regardless of state of the load (lamp) branch. As has been discussed above, that operating mode (e) could have an $I_{input}$ too small that soft-switching condition 2* may not be met. But with the existence of the extra current through the auxiliary resonant tank, enough inductive current flows through the two MOSFETs, thus satisfying condition 2* for soft switching.

The use of the auxiliary resonant tank for soft switching makes it easy to meet conditions 1 * and 2*. For a specific selection of the auxiliary tank components' parameters, when the switching ratio is given, the maximum current through the auxiliary tank is determined accordingly. When this current is above the current threshold, soft switching can be achieved. Of course, superfluous inductive current undoubtedly ensures soft switching, but it gives rise to larger conduction loss in the power switches and higher switch's current ratings requirement. So components' parameters and switching frequency ratio should be carefully chosen in the consideration of soft switching current threshold and switch's conduction loss and current ratings.

In the prototype circuit, the parameters are selected like this: $C_r=2.35$ nF, $L_r=114$ uH, $L_s=3.5$ mH, $L_a=160$ uH, $C_a=2.2$ nF. Thus in the original LCL resonant tank, the higher resonant frequency $f_{rH}$ is 308 kHz, the lower resonant frequency $fr_L$ is 55 kHz, one pseudo-inductive region ($f_{rh}/5$, $f_{rh}/4$) of $f_{rH}$ is within (62 kHz, 77 kHz). In this embodiment of the present invention, the parameters of the auxiliary resonant tank are chosen in such a way that some of its pseudo-inductive regions at least partially overlap with those of the original resonant circuits, and the starting inverter frequency can be chosen to be within the pseudo-inductive region of the auxiliary tank. In this case, the resonant frequency of the auxiliary can be relatively high in a sense that it is close to the high resonant frequency of the original resonant circuit. For the auxiliary resonant tank in this example, the resonant frequency $f_a$ is 280 kHz, and one pseudo-inductive region ($f_a/5$, $f_a/4$) is within (56 kHz, 70 kHz). Thus the starting frequency region can be selected as being somewhere between 57 kHz and 69 kHz, which is within the pseudo-inductive frequency region of the auxiliary resonant tank and overlaps with the pseudo-inductive region of the original resonant circuit.

Once the lamp is turned on, the inverter switching frequency can be increased from $fs=fs_L$ to $fs=fs_H$ (a relatively higher switching frequency higher than the resonant frequencies of the original resonant tank $fr_H$ and the auxiliary resonant tank $f_a$, so that both resonant branches are in the inductive state.

Experimental Verification

Test 5:

Simulated and experimental waveforms of $V_{input}$ and $i_{input}$ were obtained from the circuit example under the following conditions are included.

(i) Starting Inverter frequency $fs_L=64$ kHz, with an open circuit load (representing a lamp before ignition).—FIG. 16.

Figure 17:
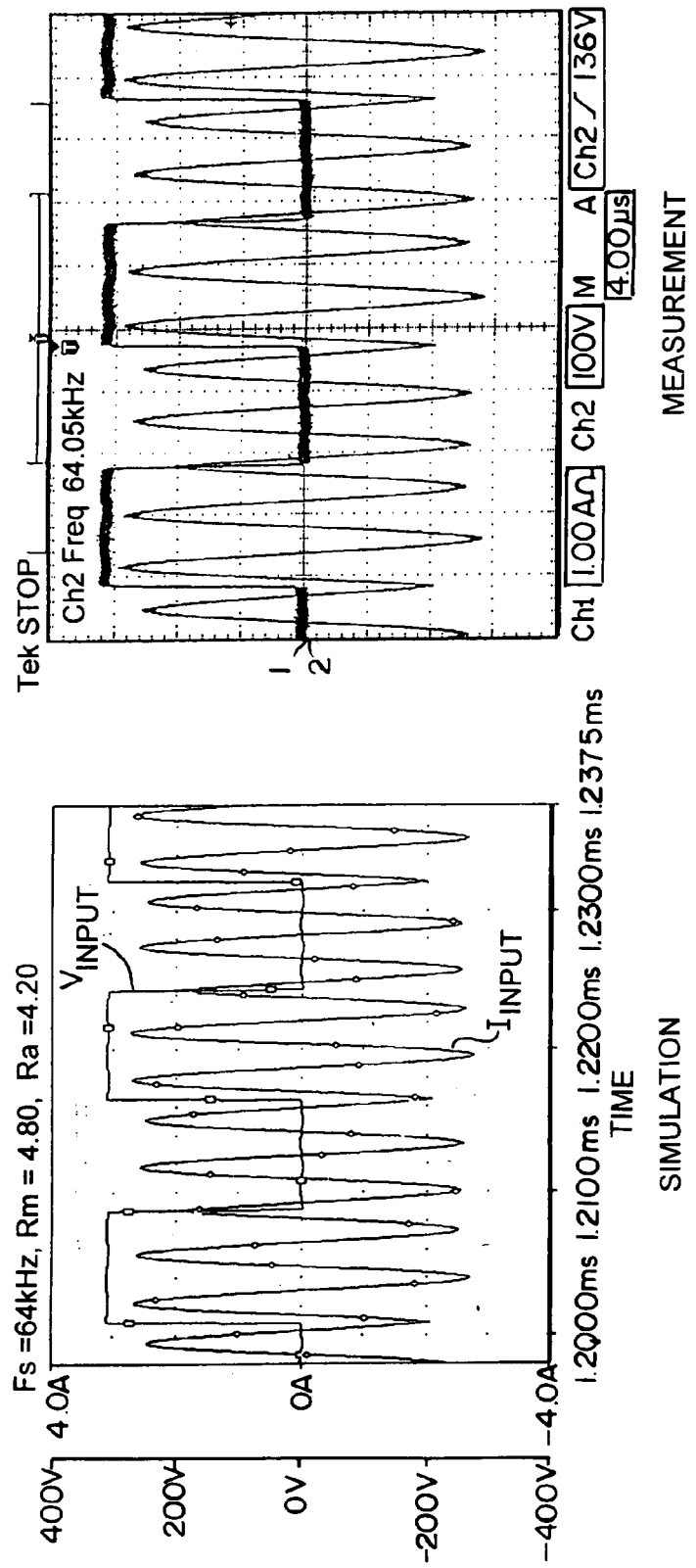
FIG. 17 shows simulated (left) and measured (right) voltage and current waveforms in a test of the second embodiment of the invention.

(ii) Starting Inverter frequency $fs_L=64$ kHz, with a short circuit load (representing a lamp in the glow-to-arc transition).—FIG. 17.

Figure 18:
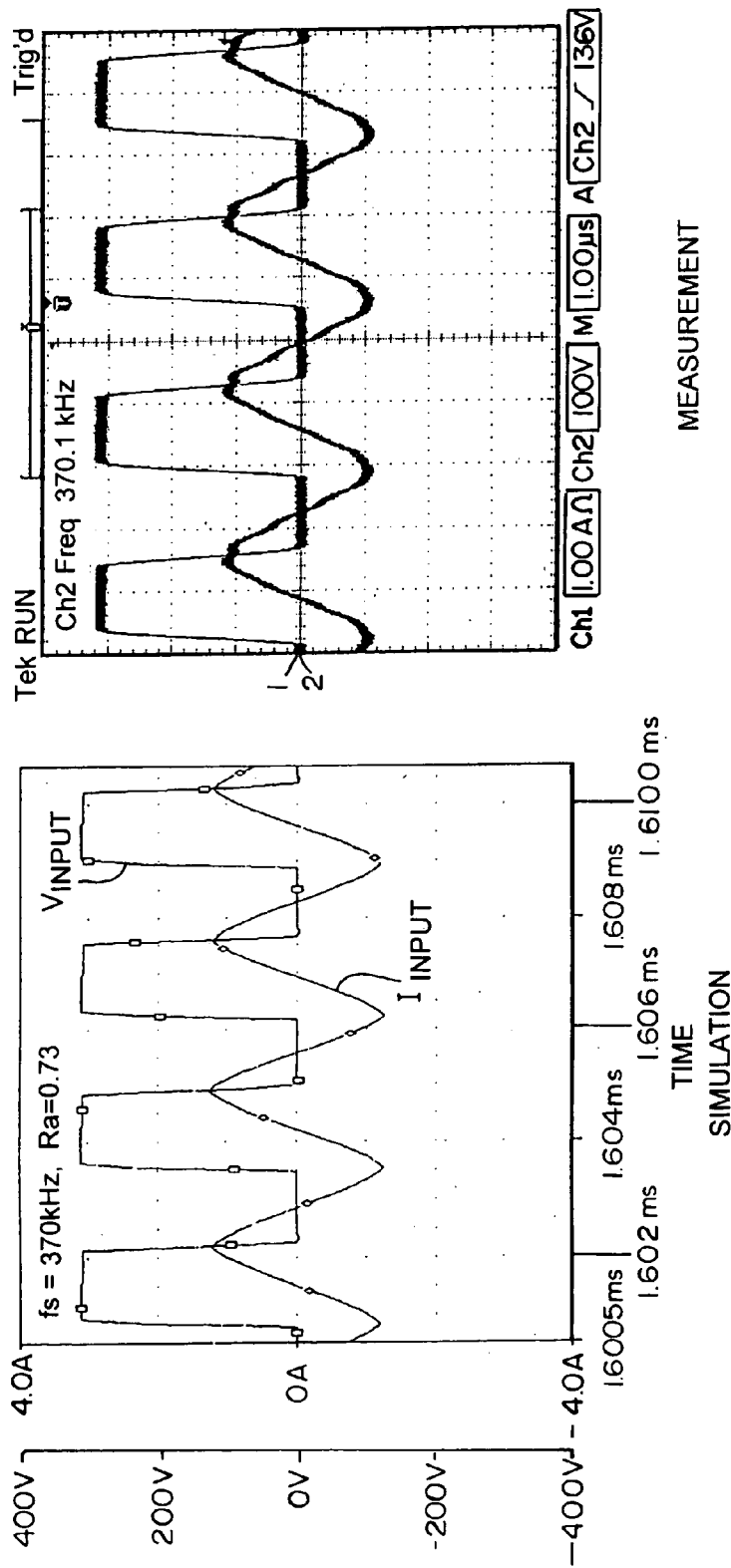
FIG. 18 shows simulated (left) and measured (right) voltage and current waveforms in a test of the second embodiment of the invention.

(iii) Steady-state inverter frequency $fs=fs_H=370$ kHz (higher than $fr_H=308$ kHz and $f_a=280$ kHz), with an open circuit load (representing a lamp arc extinction).—FIG. 18.

Figure 19:
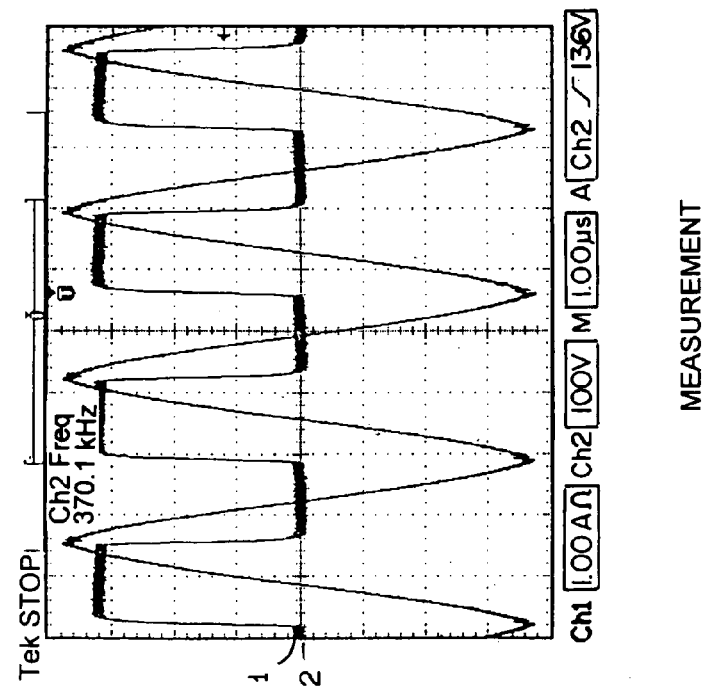
FIG. 19 shows simulated (left) and measured (right) voltage and current waveforms in a test of the second embodiment of the invention.
Figure 19:
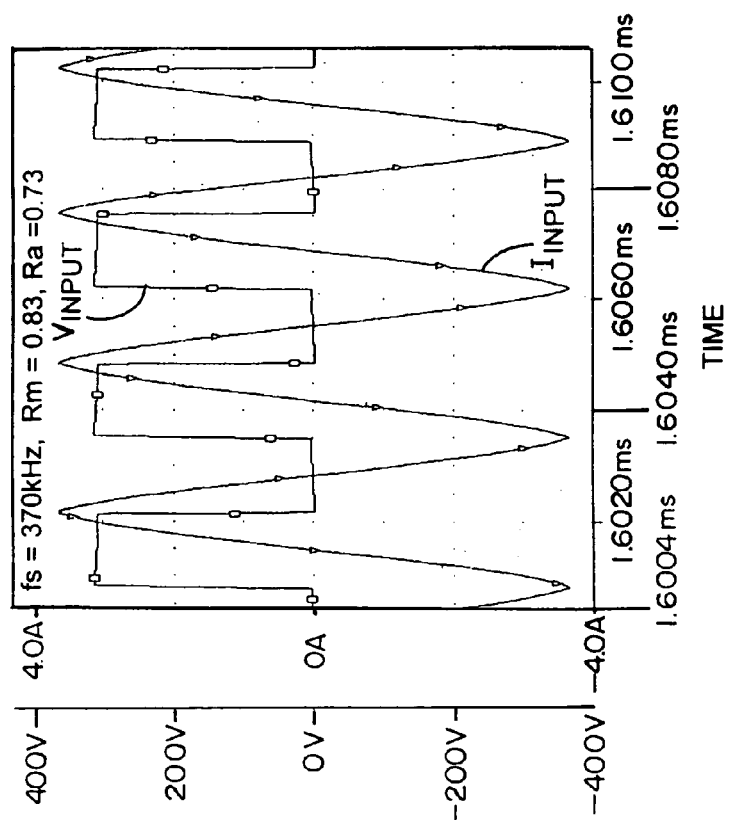

(iv) Steady-state inverter frequency $fs=fs_H 370$ kHz (higher than $fr_H=308$ kHz and $f_a=280$ kHz), with an short circuit load (representing short-circuit load condition).—FIG. 19.

All simulated and measured results confirm that soft switching can be achieved at the relatively low starting inverter frequency operation and the high inverter frequency operation under both open and short circuit conditions. These results verify the high reliability offered by the proposed auxiliary resonant branch and pseudo-inductive soft-switching method.

(B) Alternative implementation of auxiliary parallel resonant tank (Linear charging and discharging mode) (FIG. 20)

An alternative way to implement the auxiliary resonant branch is shown in FIG. 20. In this case, the dc blocking capacitor Cb, that is commonly used in high-frequency inverter to remove the dc voltage component, is employed as part of the auxiliary resonant tank. Because the size of Cb is relatively large (typically in the order of micro-Farad), the resonant frequency fa of Cb and La is relatively low.

Figure 21:
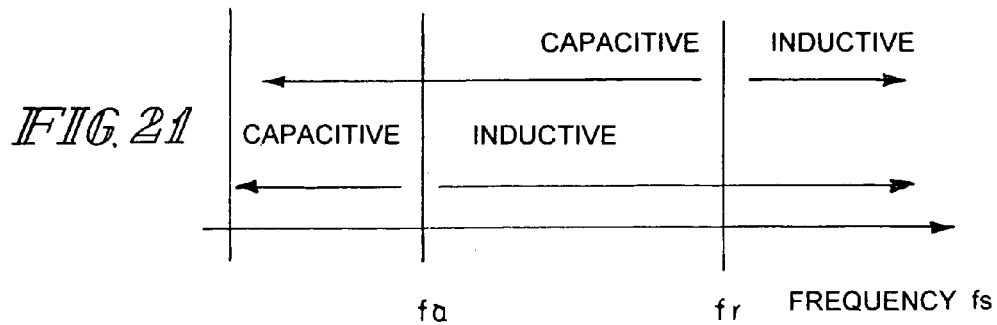
FIG. 21 illustrates schematically the effect of the auxiliary resonant tank on the inductive region, FIG. 22 plots calculated auxiliary inductance upper limit against switching frequency, FIG. 23 plots calculated maximum auxiliary inductor current against switching frequency.

Consider the nature of the resonant tanks of the original resonant tank and the auxiliary one in FIG. 21. If the resonant frequency fa of the auxiliary resonant tank is chosen to be lower than the resonant frequency fr of the original resonant circuit, the use of the auxiliary resonant tank can widen the inductive frequency range of the overall circuit for achieving soft switching Equations (1)–(3) can be rewritten for FIG. 20 as follows:

The current through the auxiliary inductor can be formulated by the following equation:

$$i_{input} = (-V_g/2L_a)(1/2f_s - T_d) + V_g t/L_a (0 \leq t \leq 1/2f_s - T_d) \quad (10)$$

where Vg is the dc voltage of the inverter, Td is the dead time between S1 and S2. The charge to be removed from the power switch's total equivalent capacitance is:

$$Qs = \int_{-t_d/2}^{t_d/2} ((-V_g/2L_a)(1/2f_s - T_d)) dt \geq 2C_s V_g \quad (11)$$

where Qs is the charge and Cs is the total equivalent capacitance across the drain and source of the power switch. This equation can be simplified as:

$$(T_d/4C_s)(1/2f_s - T_d) \geq L_a \quad (12)$$

Figure 22:
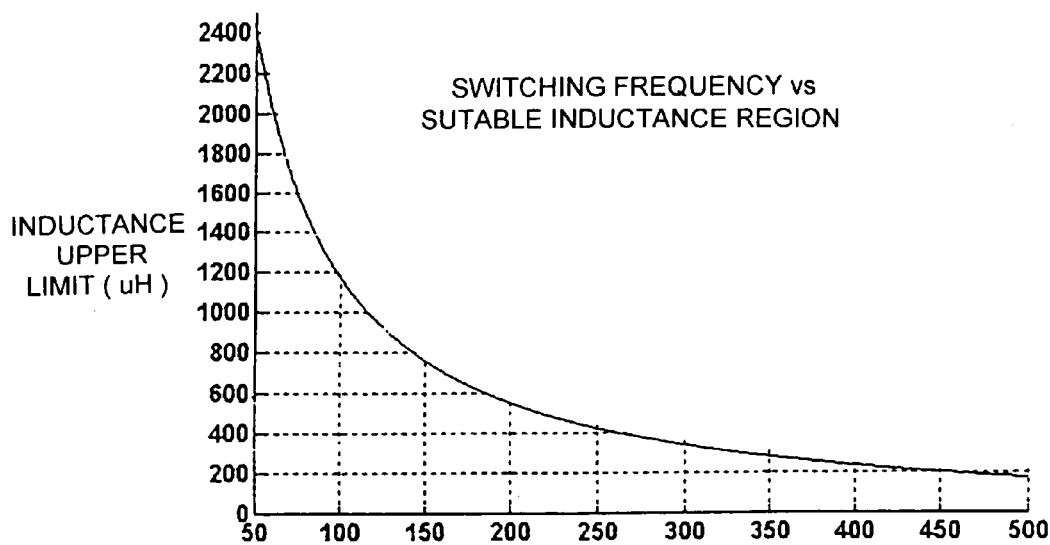

This means that the inductance of the auxiliary inductor cannot exceed a certain limit as shown in (12) in order to achieve soft switching. By using this equation, the needed auxiliary inductance can be determined. When the dead time $T_d$ and the parallel capacitance of MOSFET $C_s$ are given, the upper limit of the auxiliary inductance can be determined by switching frequency. FIG. 22 shows the relationship between switching frequency and the upper limit of the inductance in the example.

Figure 23:
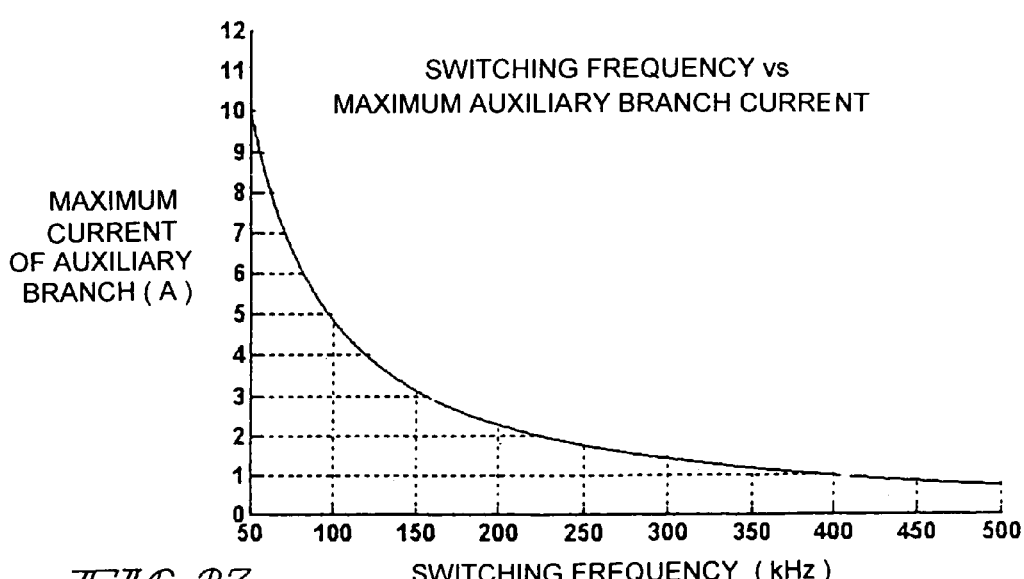

From this graph, it is clear that the auxiliary inductance should be set below 180 uH in this example if the ballast works up to about 500 kHz. When the value of the auxiliary inductor is set at 180 kHzμH, then the maximum current through the auxiliary branch can be determined by equation (10) and the relationship between this maximum current and the switching frequency can be shown by FIG. 23.

In the prototype circuit (FIG. 20), the selected parameters are: $C_r$=1.1 nF, $L_r$=170 μH, $L_s$=1.5 mH, $L_a$=120 μH, $C_b$=1 μF. Thus in the LCL resonant tank, the higher resonant frequency $f_{rH}$ is 368 kHz, the lower resonant frequency $fr_L$ is 123 kHz, one pseudo-inductive region ($fr_H/3$, $fr_H/2$) is within (124 kHz, 185 kHz). The starting frequency region can be selected as between 130 kHz and 140 kHz. Note that the resonant frequency of the auxiliary resonant tank consisting of La and Cb is $f_a = 1/(2\pi sqrt(L_a C))$=14.53 kHz, which is much lower than the minimum resonant frequency (123 kHz) of the original multi-resonant tank circuit. If necessary this resonant frequency can be set at a higher value by using smaller auxiliary inductor $L_a$.

Test 6:

Simulated and experimental waveforms of $V_{input}$ and $i_{input}$ were obtained from the circuit example (FIG. 20) under the following conditions are included.

Figure 24:
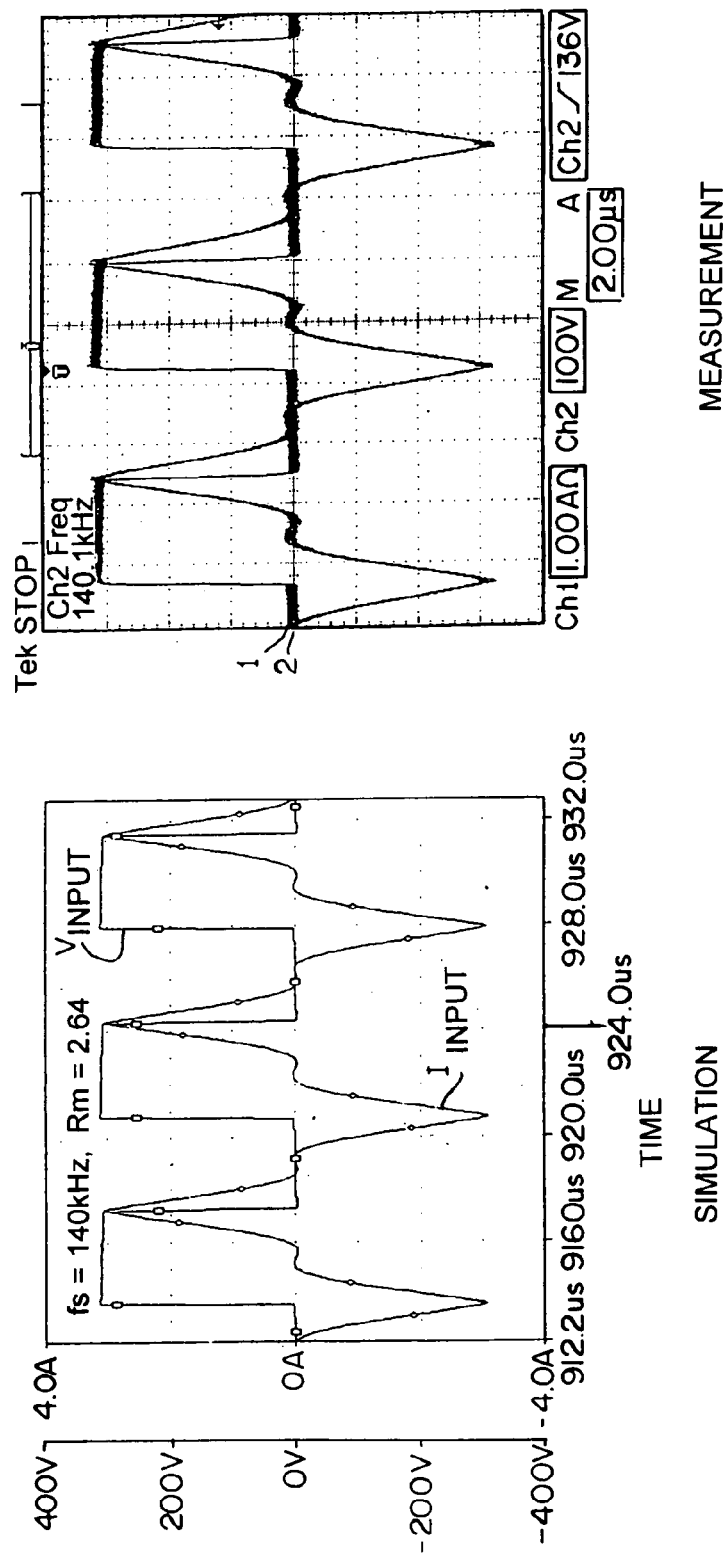
FIG. 24 shows simulated (left) and measured (right) voltage and current waveforms in a test of an alternative form of the second embodiment of the invention.

(v) Starting Inverter frequency $fs_L$=140 kHz (higher than fa=14.5 kHz and $f_{rL}$=123 kHz), with an open circuit load (representing a HID lamp before ignition).—FIG. 24.

Figure 25:
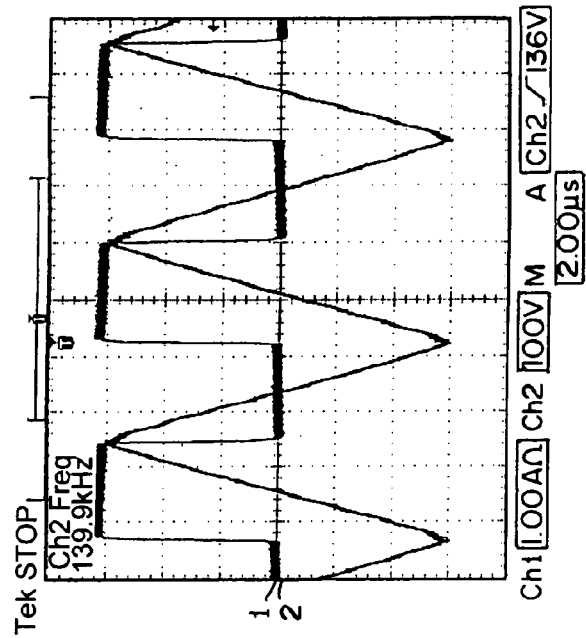
FIG. 25 shows simulated (left) and measured (right) voltage and current waveforms in a test of an alternative form of the second embodiment of the invention.
Figure 25:
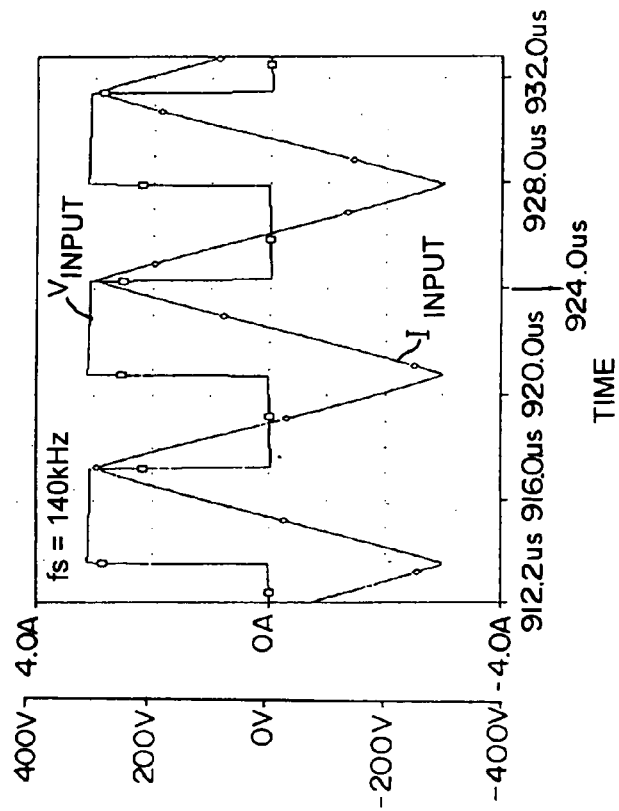

(vi) Starting Inverter frequency $fS_L$=140 kHz (higher than fa=14.5 kHz and $f_{rL}$=123 kHz), with a short circuit load (representing a HID lamp in the glow-to-arc transition).—FIG. 25.

Figure 26:
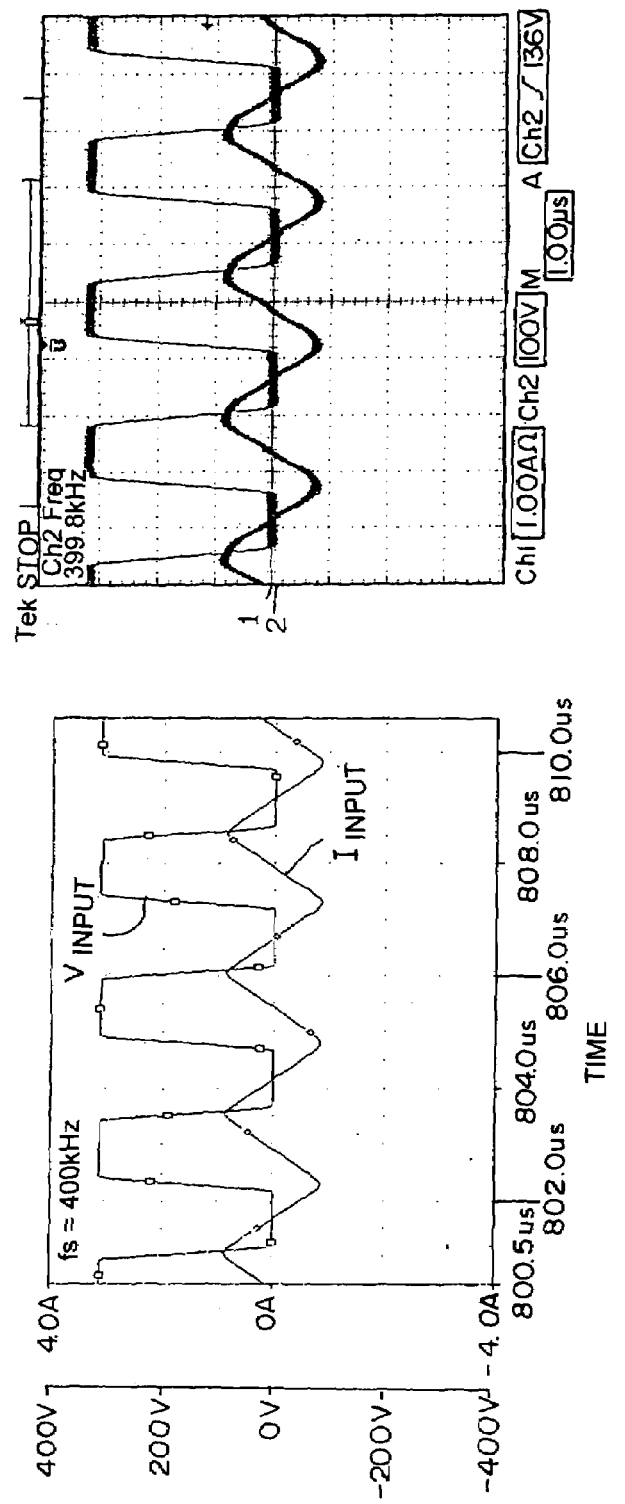
FIG. 26 shows simulated (left) and measured (right) voltage and current waveforms in a test of an alternative form of the second embodiment of the invention.

(vii) Steady-state inverter frequency fs=$fs_H$=400 kHz (higher than $fr_H$=368 kHz), with an open circuit load (representing a lamp arc extinction).—FIG. 26.

Figure 27:
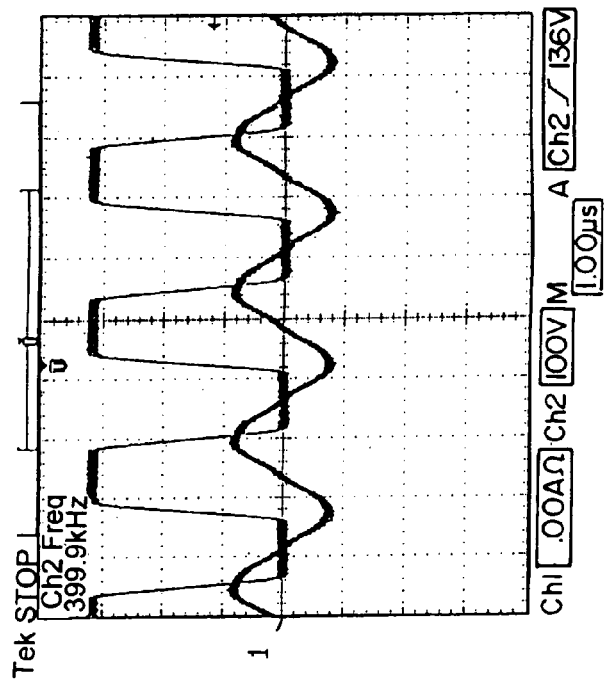
FIG. 27 shows simulated (left) and measured (right) voltage and current waveforms in a test of an alternative form of the second embodiment of the invention.
Figure 27:
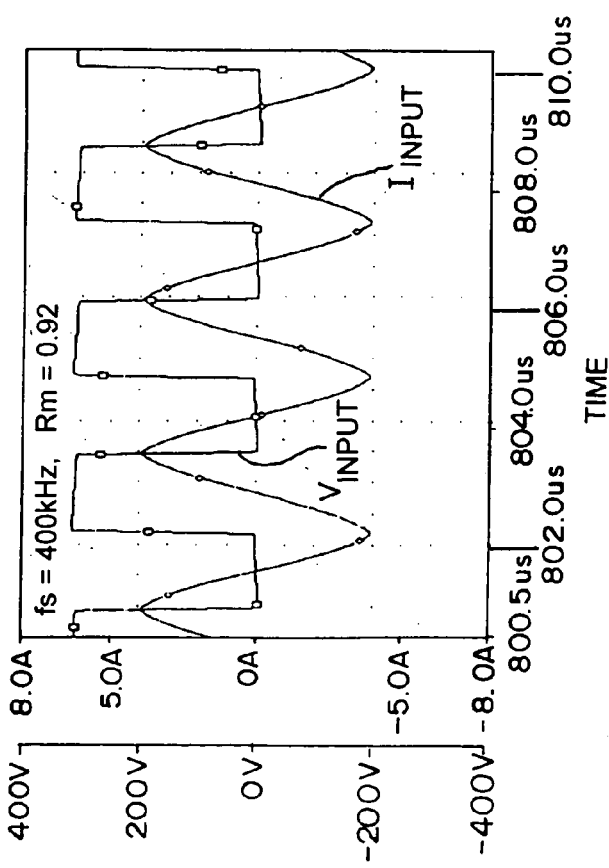

(viii) Steady-state inverter frequency fs=$fs_H$=400 kHz (higher than $fr_H$=368 kHz), with an short circuit load (representing short-circuit load condition).—FIG. 27.

The simulating and experimental waveforms of $V_{input}$ and $i_{input}$ at various operating conditions using the circuit example of FIG. 20 are given below:

The invention claimed is:

1. A circuit comprising an inverter having a switching frequency $f_s$ and a resonant tank circuit electrically coupled with the inverter and configured to have a resonant frequency $f_r$ such that K<$f_r/f_s$<K+1, wherein K is an even integer.

2. The circuit of claim 1, wherein the resonant tank circuit is an LCL resonant tank circuit.

3. The circuit of claim 1, wherein the resonant tank circuit is a multi-resonant tank circuit.

4. The circuit of claim 1, wherein the resonant tank circuit is configured such that the resonant frequency, $f_r$, is altered during operation of the circuit.

5. The circuit of claim 1, further comprising an auxiliary resonant tank circuit electrically coupled to the inverter and the resonant tank circuit, the auxiliary resonant tank circuit being configured to have a resonant frequency, $f_a$, such that K<$f_a/f_s$<K+1, wherein K is an even integer.

6. The circuit of claim 1, wherein the resonant tank circuit is configured to have a second resonate frequency, $f_{r2}$, such that $f_{r2}$<$f_r$.

7. A circuit comprising an inverter having a switching frequency, $f_s$, a first resonant tank circuit electrically coupled with the inverter and configured to have a first resonant frequency $f_{r1}$ and a second resonant frequency $f_{r2}$ such that $f_{r1}$<$f_{r2}$ and K<$f_s/f_{r2}$<K+1, where K is an even integer, and a second resonant tank circuit electrically coupled with the inverter and the first resonant tank circuit, the second resonant tank circuit having a resonant frequency $f_a$ such that K<$f_a/f_s$<K+1.

8. The circuit of claim 7, wherein the inverter is configured to have a second switching frequency $f_{s2}$ such that $f_{s2}$>$f_{s1}$ and $f_{s2}$>$f_{r2}$.

9. The circuit of claim 7, wherein the inverter is configured to have a second switching frequency $f_{s2}$ such that $f_{s2}$>$f_{s1}$, and $f_{s2}$>$f_a$.

10. A method of supplying power to a load having a resonant frequency $f_r$, the method comprising switching an inverter coupled to the load at a switching frequency $f_s$ such that K<$f_r/f_s$<K+1, where K is an even integer.

* * * * *